United States Patent
Yoshimoto et al.

(10) Patent No.: US 10,660,126 B2
(45) Date of Patent: May 19, 2020

(54) COMMUNICATION DEVICE AND COMMUNICATION METHOD

(71) Applicants: SHARP KABUSHIKI KAISHA, Sakai, Osaka (JP); OSAKA UNIVERSITY, Suita-shi, Osaka (JP)

(72) Inventors: Takashi Yoshimoto, Sakai (JP); Jungo Goto, Sakai (JP); Osamu Nakamura, Sakai (JP); Yasuhiro Hamaguchi, Sakai (JP); Seiichi Sampei, Suita (JP); Shinsuke Ibi, Suita (JP)

(73) Assignees: SHARP KABUSHIKI KAISHA, Sakai, Osaka (JP); OSAKA UNIVERSITY, Suita-shi, Osaka (JP)

( * ) Notice: Subject to any disclaimer, the term of this patent is extended or adjusted under 35 U.S.C. 154(b) by 6 days.

(21) Appl. No.: 16/074,038

(22) PCT Filed: Jan. 31, 2017

(86) PCT No.: PCT/JP2017/003319
§ 371 (c)(1),
(2) Date: Jul. 30, 2018

(87) PCT Pub. No.: WO2017/135221
PCT Pub. Date: Aug. 10, 2017

(65) Prior Publication Data
US 2019/0045540 A1 Feb. 7, 2019

(30) Foreign Application Priority Data
Feb. 1, 2016 (JP) ................................ 2016-016882

(51) Int. Cl.
*H04W 74/06* (2009.01)
*H04W 16/14* (2009.01)
(Continued)

(52) U.S. Cl.
CPC .......... *H04W 74/06* (2013.01); *H04W 16/14* (2013.01); *H04W 72/1215* (2013.01);
(Continued)

(58) Field of Classification Search
None
See application file for complete search history.

(56) References Cited

U.S. PATENT DOCUMENTS 9,131,520 B1 * 9/2015 Wheeler ........... H04W 72/1215
2001/0010689 A1 * 8/2001 Awater .................. H04W 16/14
370/344

(Continued)

FOREIGN PATENT DOCUMENTS

JP  2013-201516 A  10/2013

OTHER PUBLICATIONS

"IEEE Standard for Information technology—Local and metropolitan area networks—Specific requirements—Part 11: Wireless LAN Medium Access Control (MAC) andPhysical Layer (PHY) Specifications: Further Higher Data Rate Extension in the 2.4GHz Band" IEEE Std 802.11g-2003, Jun. 2003.

(Continued)

*Primary Examiner* — Bunjob Jaroenchonwanit
(74) *Attorney, Agent, or Firm* — ScienBiziP, P.C.

(57) ABSTRACT

Provided is a communication device, even in a case that many communication devices are connected in a radio communication network constituted of a plurality of different radio communication technologies, that suppresses data transmission of one communication technology from delaying due to data transmission situation of another communication device and enables coexistence of different radio communication technologies. A communication device for transmitting and/or receiving a signal using a plurality of radio communication systems, the communication device (Continued)

includes transmitting a signal configured to reserve a first frequency indicating that a radio wave of a prescribed frequency band is used using a first radio communication system among the plurality of radio communication systems; and transmitting, after transmitting the signal indicating that the radio wave is used, a signal configured to request transmission of data to another communication device using a second radio communication system that is different from the first radio communication system.

2 Claims, 16 Drawing Sheets

(51) Int. Cl.
| | | |
|---|---|---|
| H04W 72/12 | (2009.01) | |
| H04W 88/06 | (2009.01) | |
| H04W 84/12 | (2009.01) | |
| H04W 88/10 | (2009.01) | |
| H04W 4/70 | (2018.01) | |
| H04W 4/80 | (2018.01) | |
| H04B 1/7143 | (2011.01) | |

(52) U.S. Cl.
CPC ............. *H04B 1/7143* (2013.01); *H04W 4/70* (2018.02); *H04W 4/80* (2018.02); *H04W 84/12* (2013.01); *H04W 88/06* (2013.01); *H04W 88/10* (2013.01)

(56) References Cited

U.S. PATENT DOCUMENTS

| | | | | |
|---|---|---|---|---|
| 2005/0018706 A1* | 1/2005 | Myojo | ................... | H04J 3/0685 |
| | | | | 370/445 |
| 2005/0246114 A1* | 11/2005 | Rannow | ................. | G01R 15/20 |
| | | | | 702/65 |
| 2006/0205401 A1* | 9/2006 | Palin | .................... | H04M 1/2535 |
| | | | | 455/425 |
| 2007/0201419 A1* | 8/2007 | Miller | ............... | H04W 52/0225 |
| | | | | 370/338 |
| 2008/0075029 A1* | 3/2008 | Song | ..................... | H04L 45/123 |
| | | | | 370/311 |
| 2010/0240980 A1* | 9/2010 | Zhu | ...................... | A61B 5/0022 |
| | | | | 600/372 |
| 2012/0202551 A1* | 8/2012 | Mirbaha | ................. | H04W 4/08 |
| | | | | 455/518 |
| 2013/0182798 A1* | 7/2013 | Lozano | ............... | H04L 65/4084 |
| | | | | 375/340 |
| 2013/0252554 A1* | 9/2013 | Nakakita | ........... | H04W 72/1215 |
| | | | | 455/41.2 |
| 2015/0063205 A1* | 3/2015 | Elliott | ................. | H04L 61/6022 |
| | | | | 370/328 |
| 2015/0079907 A1* | 3/2015 | Engelien-Lopes | ........................... | |
| | | | | H04W 52/0212 |
| | | | | 455/41.2 |
| 2018/0014241 A1* | 1/2018 | Perdomo | ............... | H04W 40/12 |

OTHER PUBLICATIONS

"Bluetooth SIG: Bluetooth specification version 4.2" Dec. 2014, (https://www.bluetooth.org/ja-jp/specification/adopted-specifications).

* cited by examiner

COMMUNICATION DEVICE AND COMMUNICATION METHOD

TECHNICAL FIELD

The present invention relates to a communication device and a communication method.

BACKGROUND ART

By using different radio communication technologies such as a wireless LAN that is called WiFi (registered trademark) such as IEEE802.11b, g, n, or the like, a short-range radio communication Bluetooth (registered trademark) Low Energy (BLE), or the like, a heterogeneous radio communication network is constructed (NPL 1 and NPL 2). Many apparatuses such as information terminals such as smartphones or the like, sensors, or the like are connected to this radio communication network.

Both the wireless LAN and the BLE use an Industry Science Medical (ISM) Band of 2.4 GHz. In the BLE, in order to avoid interference of an apparatus equipped with the wireless LAN, an Adaptive Frequency Hopping (AFH) is applied (NPL 2). The BLE performs communication using the AFH while avoiding a frequency channel used by the wireless LAN.

CITATION LIST

Non Patent Literature

NPL 1: "IEEE Standard for Information technology—Local and metropolitan area networks—Specific requirements—Part 11: Wireless LAN Medium Access Control (MAC) and Physical Layer (PHY) Specifications: Further Higher Data Rate Extension in the 2.4 GHz Band" IEEE Std 802.11g-2003, June 2003

NPL 2: "Bluetooth SIG: Bluetooth specification version 4.2" February 2014 (https://www.bluetooth.org/ja-jp/specification/adopted-specifications)

SUMMARY OF INVENTION

Technical Problem

However, in an area in which there are many apparatuses equipped with the wireless LAN, the wireless LAN frequently occupies the frequency channels. Furthermore, in a heterogeneous network, it is expected that there are many sensors equipped with the BLE. Accordingly, idle channels for the BLE decrease in the frequency and time. Additionally, transmit power of the BLE is generally smaller than transmit power of the wireless LAN, and, in a case that packets of both sides collide with each other, there is thus high possibility that the packet of the BLE disappears. As a result, the packet is required to be re-transmitted, delay in data transmission in the BLE is problematic.

The present invention has been made in view of the above-described circumstances, and an object thereof is, even in a case that many communication devices are connected in a radio communication network constituted of a plurality of different radio communication technologies, to provide a communication device and a communication method that suppresses data transmission of one communication technology from delaying due to data transmission situation of another communication device and enables coexistence of different radio communication technologies.

Solution to Problem

To address the above-mentioned drawbacks, a communication device and a communication method according to an aspect of the present invention are configured as follows.

An aspect of the present invention is a communication device for transmitting and/or receiving a signal using a plurality of radio communication systems, the communication device includes: transmitting a signal configured to reserve a first frequency indicating that a radio wave of a prescribed frequency band is used using a first radio communication system among the plurality of radio communication systems; and transmitting, after transmitting the signal indicating that the radio wave is used, a signal configured to request transmission of data to another communication device using a second radio communication system that is different from the first radio communication system.

Furthermore, in an aspect of the present invention, the communication device may transmit a signal configured to reserve the first frequency using a radio communication system that uses an OFDM signal, and transmit a signal configured to request transmission of data to another communication device using a radio communication system that does not use the OFDM signal, in which a use frequency band width of the radio communication system that uses the OFDM signal is wider than a use frequency band width of the radio communication system that does not use the OFDM signal.

Furthermore, in an aspect of the present invention, in the communication device, the radio communication system that does not use the OFDM signal may be Bluetooth (registered trademark) Low Energy.

Furthermore, in an aspect of the present invention, in the communication device, a center frequency of a signal used in the first radio communication system and a center frequency of a signal used in a radio communication system different from the first radio communication system may be different from each other.

Furthermore, in an aspect of the present invention, in the communication device, transmit power of the signal configured to request the transmission of data to the other communication device may be smaller than transmit power of the signal configured to reserve the first frequency.

Furthermore, in an aspect of the present invention, the communication device may transmit, before transmitting data using the first radio communication system, a signal configured to reserve a second frequency indicating that a radio wave of a prescribed frequency band is used, in which the signal configured to reserve the first frequency has transmit power smaller than transmit power of the signal configured to reserve the second frequency.

Furthermore, in an aspect of the present invention, the signal configured to reserve the first frequency may be configured based on an effective connection interval of the signal configured to request the transmission of data to the other communication device.

Furthermore, in an aspect of the present invention, the signal configured to reserve the first frequency may include a first transmission prohibition period indicating prohibition of transmission to another communication device, and the signal configured to request the transmission of data to the other communication device may be transmitted during the first transmission prohibition period.

Furthermore, in an aspect of the present invention, the first transmission prohibition period may be configured to a connection event period of the signal configured to request the transmission of data to the other communication device.

Furthermore, in an aspect of the present invention, the communication device may alternately configure the connection event period of the signal configured to request the transmission of data to the other communication device and a connection event period other than the signal configured to request the transmission of data, in which the first transmission prohibition period includes a plurality of the connection event periods of the signal configured to request the transmission of data to the other communication device.

Furthermore, in an aspect of the present invention, the communication device may transmit, before transmitting data using the first radio communication system, the signal configured to reserve the second frequency indicating that the radio wave of the prescribed frequency band is used, in which the signal configured to reserve the second frequency includes a second transmission prohibition period indicating prohibition of transmission to another communication device, and the first transmission prohibition period is different from the second transmission prohibition period.

Furthermore, in an aspect of the present invention, the communication device may transmit, after transmitting the signal configured to reserve the first frequency, a signal including service set identification information identifying a network of the first radio communication system, and may configure, in a case of transmitting the signal configured to request the transmission of data to the other communication device using the second radio communication system, information indicating not to designate a specific network to the service set identification information.

Furthermore, in an aspect of the present invention, the communication device may transmit, after transmitting the signal configured to reserve the first frequency, a signal including system identification information indicating whether or not to perform data transmission using the first radio communication system, and may transmit, in a case that the system identification information stores an identifier indicating that data transmission is performed using a communication system other than the wireless LAN, a signal configured to request transmission of data to another communication device using the second radio communication system.

Furthermore, in an aspect of the present invention, the communication device may receive a signal configured to reserve a third frequency indicating that a radio wave of a prescribed frequency band is used using the first radio communication system among the plurality of radio communication systems, and may configure the signal configured to reserve the first frequency to a transmission prohibition period indicated by the signal configured to reserve the third frequency.

An aspect of the present invention is a communication method in a communication device for transmitting and/or receiving a signal using a plurality of radio communication systems, the communication method includes the steps of: transmitting a signal configured to reserve a first frequency indicating that a radio wave of a prescribed frequency band is used using a first radio communication system among the plurality of radio communication systems; and transmitting, after transmitting the signal indicating that the radio wave is used, a signal configured to request transmission of data to another communication device using a second radio communication system that is different from the first radio communication system.

Advantageous Effects of Invention

According to an aspect of the present invention, even in a case that many communication devices are connected in a radio communication network constituted of multiple different radio communication technologies, data transmission of one communication technology is suppressed from delaying due to data transmission situation of another communication technology, and different radio communication technologies are capable of coexisting.

DESCRIPTION OF EMBODIMENTS

First Embodiment

In a radio communication network according to the present embodiment, multiple access control schemes are combined. For example, a radio communication system of a Carrier Sense Multiple Access with Collision Avoidance (CSMA/CA) scheme and a radio communication system of a polling scheme are combined. This radio communication network is constructed using multiple radio communication systems. For example, WiFi (registered trademark) such as IEEE802.11b, g, n, or the like, Bluetooth (registered trademark), Bluetooth (registered trademark) Low Energy (BLE), IEEE802.15.4, and the like are combined. The radio communication network according to the present embodiment is constituted using multiple radio communication technologies such as an Orthogonal Frequency Division Multiplexing (OFDM) scheme, a spectrum spreading scheme (Frequency Hopping-Spectrum Spreading (FH-SS), Direct Sequence-Spectrum Spreading (DS-SS), Complimentary Code Keying (CCK)), or the like. The radio communication network according to the present embodiment is constructed using multiple radio communication networks. For example, a Wireless Local Area Network (wireless LAN), a Wireless Personal Area Network (wireless PAN), a radio sensor network, a Wireless Body Area Network (wireless BAN), and the like are combined. This radio communication network includes a communication device equipped with multiple radio communication technologies. The communication device includes an access point, a terminal apparatus such as a smartphone or the like, a sensing device, an electronic tag, or the like.

Hereinafter, a radio communication network constructed using the radio communication system of the wireless LAN (WLAN) and the BLE will be cited as an example and described. According to the present embodiment, "X/Y" includes the meaning of "X or Y". According to the present embodiment, "X/Y" includes the meaning of "X and Y". According to the present embodiment, "X/Y" includes the meaning of "X and/or Y". Note that, the invention is not limited by this embodiment.

Figure 1:
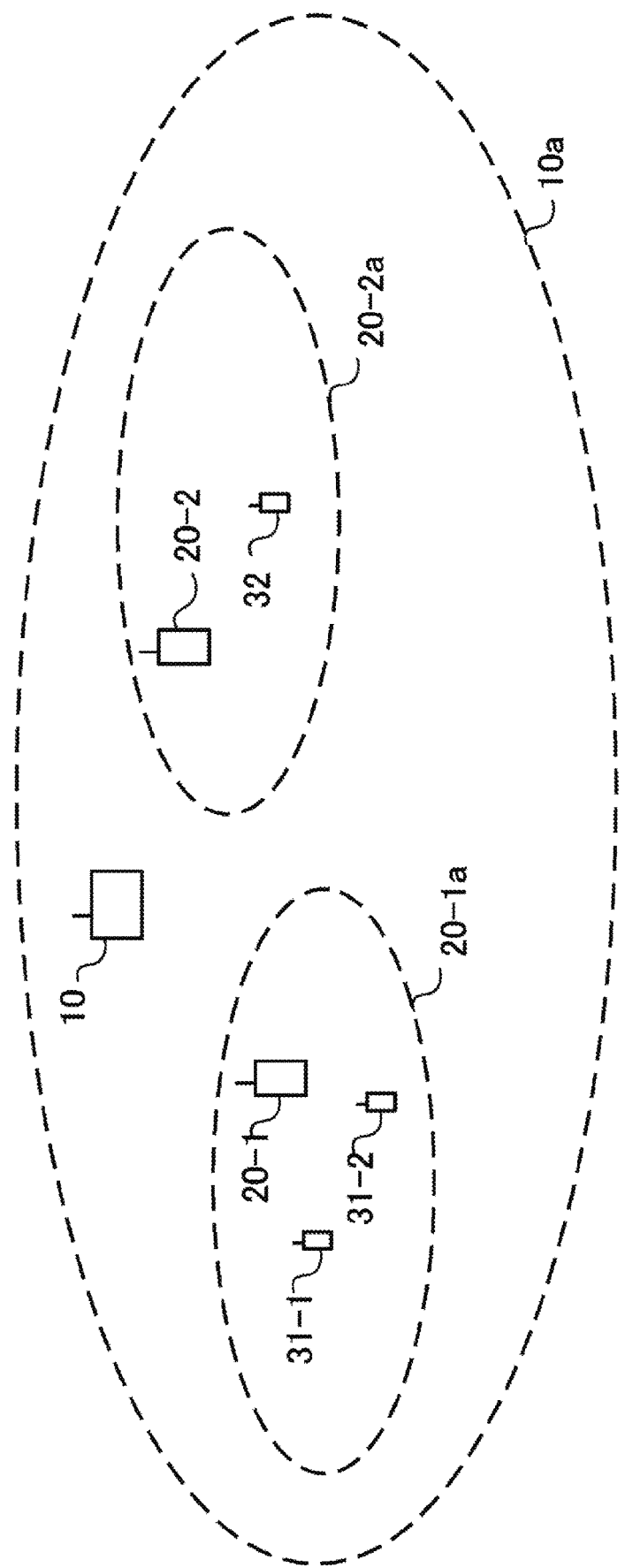
FIG. 1 is a diagram illustrating a constitution example of a radio communication network according to a first embodiment.

FIG. 1 is a diagram illustrating a constitution example of the radio communication network according to the present embodiment. As illustrated in FIG. 1, the radio communication network according to the present embodiment includes an access point 10 of the wireless LAN, communication devices equipped with the wireless LAN and the BLE (combo device, combo terminal, first communication device) 20-1 and 20-2, and communication devices equipped with the BLE (second communication device) 31-1, 31-2, and 32. The communication devices 20-1 and 20-2 are also collectively referred to as a communication device 20. The communication devices 31-1 and 31-2 are also collectively referred to as a communication device 31.

A coverage 10a is a range (communication area) in which the access point 10 can be connected to the communication device 20 (STA in wireless LAN) using a communication function of the wireless LAN. A coverage 20-1a is a range in which the communication device (center node, central, master terminal, master node in BLE) 20-1 can be connected to the communication device (terminal node, peripheral, slave terminal, slave node in BLE) 31 using a communication function of the BLE. A coverage 20-2a is a range in which the communication device 20-2 can be connected to the communication device 32 using the communication function of the BLE. For example, the communication device 20 constructs the radio sensor network or the wireless BAN with the communication devices 31 and 32 using the communication function of the BLE. Note that, the number of the communication devices 20, 31, and 32 to be installed constituting the radio communication network according to the present embodiment, is not limited to the number of devices in FIG. 1.

Figure 2:
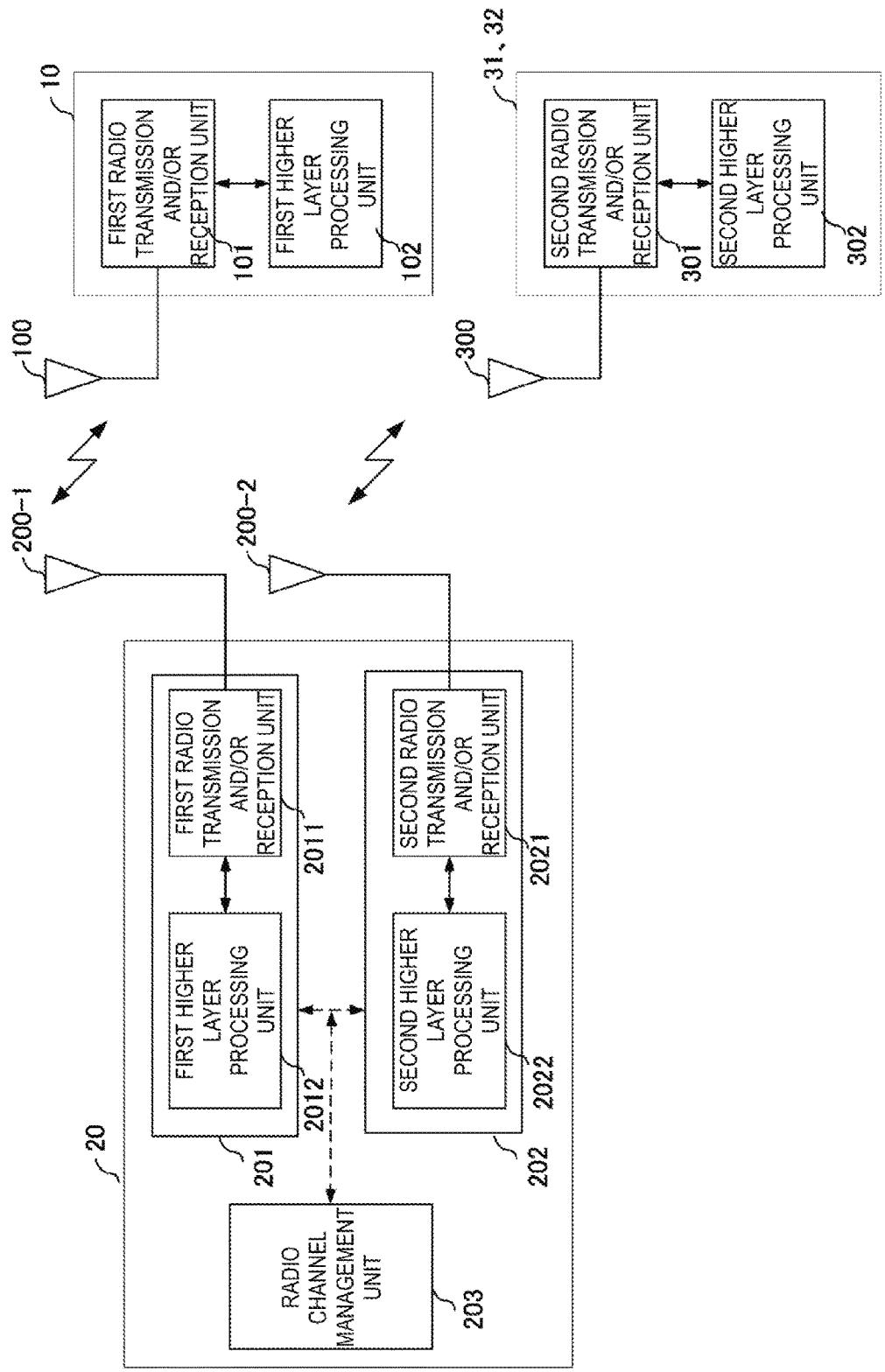
FIG. 2 is a diagram illustrating a constitution example of a communication device according to the first embodiment.

FIG. 2 is a diagram illustrating a constitution example of the communication devices according to the present embodiment. In FIG. 2, first radio transmission and/or reception units 101 and 2011 perform processing of a Physical Medium Dependent (PMD) in a hierarchical structure of the wireless LAN. First higher layer processing units 102 and 2012 perform processing of a higher layer than the physical medium dependent in the hierarchical structure of the wireless LAN, such as Physical Layer Management Information Base (PHY MIB), Physical Layer Convergence Protocol (PLCP), Medium Access Control (MAC) layer, or the like.

Second radio transmission and/or reception units 2021 and 301 perform processing of a physical layer in a hierarchical structure of the BLE. Second higher layer processing units 2022 and 302 perform processing of a higher layer than the physical layer in the hierarchical structure of the BLE, such as a link layer, a Logical Link Control and Adaptive Protocol (L2CAP), an Attribute Protocol (ATT), a Generic Attribute Profile (GATT), a Generic Access Profile (GAP), or the like. The second higher layer processing unit manages an operation state of BLE communication. The operation state includes a standby state (radio communication standby), an advertising state (advertising transmission), a scanning state (device discovery), an initiating state (participation request), a connection state (data exchange), or the like.

The access point 10 and the communication device 20 communicate with each other using a frequency channel of the wireless LAN. For example, the access point 10 and the communication device 20 communicate with each other using 13 frequency channels with a use frequency band width of 22 MHz in an ISM band. For example, the center frequencies of the 13 frequency channels are allocated at intervals of 5 MHz so as to be 2412 MHz, 2417 MHz, 2422 MHz, . . . , up to 2472 MHz, respectively. The access point 10 includes an antenna unit 100, the first radio transmission and/or reception unit (first transmission and/or reception step) 101, and the first higher layer processing unit (first higher layer processing step) 102.

The first radio transmission and/or reception unit 101 has a reception processing function in the physical medium dependent. For an Orthogonal Frequency Division Multiplexing (OFDM) signal of the wireless LAN received through the antenna unit 100, conversion into a baseband signal is performed by down-converting, unnecessary frequency components are removed, an amplification level is controlled such that a signal level is suitably maintained, and an analog signal is converted into a digital signal. The first radio transmission and/or reception unit 101 performs channel estimation, timing detection, or the like using a preamble signal among the converted digital signals. The preamble signal is a known sequence. Additionally, the first radio transmission and/or reception unit 101 performs Fast Fourier Transform (FFT) on a signal obtained by removing a portion corresponding to a cyclic prefix (CP) from the digital signal resulting from the conversion, and obtains a signal of each subcarrier. The first radio transmission and/or reception unit 101 performs demodulation processing to a data modulation signal in each subcarrier, such as Binary Phase Shift Keying (BPSK), Quadrature Phase Shift Keying (QPSK), quadrature amplitude modulation (16 QAM), 64 QAM, or the like. Furthermore, after the demodulation processing, the first radio transmission and/or reception unit 101 performs decoding processing to error correction coding, and inputs an information bit constituting an MAC frame to the higher layer processing unit. A unit with which the first radio transmission and/or reception unit 101 performs transmission and/or reception is referred to as a packet, and the packet corresponds to a mass of data constituting the MAC frame.

The first radio transmission and/or reception unit 101 has a transmission processing function in the physical medium dependent. The first radio transmission and/or reception unit 101 performs an error correction coding process such as a convolutional code or the like to the information bit constituting the MAC frame inputted from the first higher layer processing unit 102, and then performs data modulation processing such as the BPSK, the QPSK, the 16 QAM, or the like. The first radio transmission and/or reception unit 101 performs Inverse Fast Fourier Transform (Inverse FFT) on the signal after the data modulation processing to generate an OFDM symbol, and adds the CP to the OFDM symbol to generate a baseband digital signal. Additionally, the first radio transmission and/or reception unit 101 adds the preamble signal used for the timing detection, the channel estimation, or the like or other physical layer header to the digital signal. Furthermore, the first radio transmission and/or reception unit converts the digital signal to which this preamble signal or the like is added to an analog signal, up-converts the converted signal to a signal with a carrier frequency, performs power amplification, and transmits the resulting signal through an antenna 101. Note that, the transmission scheme according to the present embodiment is not limited to the OFDM, the spectrum spreading scheme or the like can also be applied.

The first higher layer processing unit 102 reads the information bit inputted from the first radio transmission and/or reception unit 101 based on the MAC frame format of each function of the wireless LAN. A management frame such as beacon, a probe request, or the like, a control frame such as a Request To Send (RTS) frame, a Clear To Send (CTS) frame, or the like, a data frame, or the like correspond to the MAC frame format. For example, the first higher layer processing unit 102 reads a transmission request transmitted from the communication device 20 based on the MAC frame format of the RTS.

The first higher layer processing unit 102 generates the MAC frame of each function of the wireless LAN. The MAC frame includes the CTS frame, an ACK frame, or the like. The first higher layer processing unit 102 generates the CTS frame (CTS message) based on the MAC frame format of the CTS. The information bit written in each field constituting the CTS frame is inputted to the first radio transmission and/or reception unit 101. The CTS has a function indicating reception preparation completion to the communication device that has transmitted the RTS. Additionally, the CTS has a function indicating that a radio wave of a prescribed frequency band is used. The CTS includes information indicating a transmission prohibition (Network Allocation Vector (NAV)) period. The transmission prohibition period (NAV period) is configured in a Duration field constituting the CTS frame. The ACK frame has an Acknowledgement function indicating a normal reception to the communication device that is the transmission source. Using a Duration field included in the ACK frame, the transmission prohibition period can also be configured.

The communication device 20 includes antenna units 200-1 and 200-2, a first radio communication processing unit 201, a second radio communication processing unit 202, and a radio channel management unit 203. The first radio communication processing unit 201 performs access control of the CSMA/CA scheme. The second radio communication processing unit 202 performs access control of the polling scheme.

The first radio communication processing unit 201 includes the first radio transmission and/or reception unit (first radio transmission and/or reception step) 2011, and the first higher layer processing unit (first higher layer processing step) 2012. The second radio communication processing unit 202 includes the second radio transmission and/or reception unit (second radio transmission and/or reception step) 2021, and the first higher layer processing unit (second higher layer processing step) 2022. The first radio transmission and/or reception unit 2011 at least has the same transmission/reception processing function as that of the first radio transmission and/or reception unit 101.

The first higher layer processing unit 2012 generates the MAC frame of each function of the wireless LAN. The MAC frame includes the RTS frame, the CTS frame (CTS to self), a basic frame including a field that stores transmission data, or the like. The first higher layer processing unit 2012 inputs the information bit written in each field constituting these MAC frames to the first radio transmission and/or reception unit 2011. The first higher layer processing unit 2012 generates the RTS frame (RTS message) based on the MAC frame format of the RTS. The RTS is a signal (signal indicating transmission prohibition to another communication device) indicating that a radio wave of a prescribed frequency band is used. The RTS has a function indicating that the radio wave of a prescribed frequency band is used. The RTS frame includes information indicating the transmission prohibition period (NAV period).

The first higher layer processing unit 2012 generates the CTS frame based on the MAC frame format of the CTS. The CTS includes CTS to self. The CTS to self transmits the CTS frame to itself, and has a function indicating the transmission prohibition period to the communication device in the periphery. The transmission prohibition period is configured in the Duration field of the CTS frame. The first higher layer processing unit 2012 can also indicate the transmission prohibition period using the basic frame. The transmission prohibition period is configured using the Duration field of the basic frame.

The second radio transmission and/or reception unit 2021 has a transmission processing function in the physical layer of the BLE. The second radio transmission and/or reception unit 202 performs, after performing Gaussian Frequency Shift Keying (GFSK), frequency hopping processing (Frequency Hopping spread Spectrum (FHSS)) to an information bit constituting the BLE packet inputted from the second higher layer processing unit 2022. For example, in the frequency hopping processing, a signal after the GFSK is allocated in one frequency channel selected from 40 frequency channels with 1 MHz width (use frequency band width) determined in the use frequency band of the BLE. The second radio transmission and/or reception unit 2021 allocates the signal after the GFSK to the frequency channel, up-converts thereafter the signal to a signal with a carrier frequency, performs power amplification, and transmits the resulting signal through the antenna 200-2. For example, the center frequencies of the 40 frequency channels in the ISM band are allocated at intervals of 2 MHz so as to be 2402 MHz, 2404 MHz, 2404 MHz, . . . , up to 2480 MHz, respectively. For example, transmit power of the second radio transmitting unit 2021 is smaller than transmit power for data of the wireless LAN of the first radio transmitting unit 2011. Note that, the second radio transmission and/or reception unit 2021 may perform error correction coding with respect to the information bit constituting the BLE packet inputted from the second higher layer processing unit 2022.

The frequency channel to which the signal after the GFSK is allocated is changed (subjected to frequency hopping) with lapse of time based on a prescribed pattern (hopping pattern). The frequency hopping is performed with a prescribed cycle (operation period). A unit for the frequency hopping is also called an event.

The frequency channel of the BLE is constituted of an Advertising Channel and a data channel. The advertising channel is a channel that is used for device discovery or broadcast before network participation. The data channel is a channel that is used for data communication in a network connection state of the BLE. For example, among the 40 frequency channels, 37 channels (CH0 to CH36) are allocated to the data channels, three channels (CH37 to CH39) are allocated to the advertising channels. The second radio transmission and/or reception unit 2021 performs the frequency hopping by dividing into the advertising channels and the data channels. A period in which the advertising channel operates is called an advertising event. The advertising event is performed at a prescribed interval. The interval at which the advertising event is repeated is called an advertising interval. A unit in which the data channel operates is called a connection event. The connection event is performed at a prescribed interval. The master communication device iteratively gives the connected slave communication devices the connection event in order. An interval at which the master communication device gives the identical slave communication device the connection event is referred to as a connection interval.

The second radio transmission and/or reception unit 2021 can restrict the range of the frequency channel at which the frequency hopping is performed. For example, in a case that the first radio transmitting unit 201 configures the NAV period by the RTS frame, the CTS frame, or the like, the frequency hopping processing is performed in a range of all the frequency channels (for example, 40 frequency channels) in the configured prohibition period. On the other hand, in a case that the NAV period is not configured, the frequency hopping processing is performed in a range of an idle channel in which the communication through the wireless LAN is not performed. By changing the channel range in which the frequency hopping is performed in accordance with whether or not the NAV period is configured, many channels that does not collide with the communication through the wireless LAN can be acquired. Accordingly, even in a case that the communication device 20 communicates with many communication devices 31 and 32, data transmission through the BLE can be suppressed from delaying.

The second radio transmission and/or reception unit 2021 has a reception processing function in the physical layer of the BLE. The signal of the BLE received through the antenna unit 200-2 is converted to a baseband signal by down-converting, and the signal allocated to each of the frequency channels is extracted. The second radio transmission and/or reception unit 2021 performs GFSK demodulation processing with respect to the signal of each of the frequency channels. Furthermore, the second radio transmission and/or reception unit 2021 inputs the demodulated information data constituting the BLE packet to the second higher layer processing unit 2022.

The second higher layer processing unit 2022 generates a communication packet. The communication packet is constituted of a preamble field for synchronization, an access address field, a protocol data unit PDU, a CRC check field. In accordance with the advertising state or the connection state, a different PDU type such as an advertising channel PDU, a data channel PDU, or the like is configured.

The BLE employs polling access control. In the polling access control, access rights of all the slave nodes whose master nodes are in the network are managed. The communication device 20 transmits a polling packet at a constant interval. The second higher layer processing unit 2022 controls a timing when the polling packet is transmitted (an access timing of the slave node). The second higher layer processing unit 2022 can configure the advertising interval and the connection interval. The second higher layer processing unit 2022 can configure the minimum connection interval and the maximum connection interval. The second higher layer processing unit 2022 can configure slave latency. The slave latency is the number of times the slave ignores the polling packets (the maximum number of continuous times of not participating in the connection event). The second higher layer processing unit 2022 can configure an effective connection interval. The effective connection interval is an interval at which the slave node is required to respond to the polling packet transmitted by the master node. The effective connection interval is indicated by "connection interval×(1+the slave latency)". The second higher layer processing unit 2022 can transmit an Empty PDU packet without a payload in the connection event transmitted in the slave latency section.

The second higher layer processing unit 2022 reads response data with respect to the polling packet transmitted to the communication devices 31 and 32 from the second radio transmission and/or reception unit 2021. The second higher layer processing unit 2022 reads data in an advertisement packet inputted from the second radio transmission and/or reception unit 2021. The advertisement packet is a packet indicating the BLE network participation request transmitted by the communication devices 31 and 32. The second higher layer processing unit 2022 reads the response data inputted from the second radio transmission and/or reception unit 2021 based on a communication packet format of the BLE.

The radio channel management unit 203 configures a timing/a frequency channel/a Duration field for the transmission of the RTS frame/the CTS frame in order to make a medium reservation for the packet communication of the BLE (frequency/time reservation). The radio channel management unit 203 configures the timing/the frequency channel at which the RTS frame/the CTS frame are transmitted based on the timing, which is configured by the second higher layer processing unit 2022, when the polling packet is transmitted. The radio channel management unit 203 configures the Duration field based on the timing when the polling packet is transmitted (configures a transmission prohibition section with respect to the communication devices in the periphery). The timing when the polling packet is transmitted includes the advertising interval/the connection interval/the minimum connection interval/the maximum connection interval/the slave latency/the effective connection interval, or the like.

The radio channel management unit 203 configures the timing/the frequency channel at which the RTS frame/the CTS frame are transmitted based on the number of the advertising events/the number of the advertising intervals/the number of the connection events/the number of the connection intervals. The radio channel management unit 203 configures the Duration field based on the number of the advertising events/the number of the advertising intervals/the number of the connection events/the number of the connection intervals.

The radio channel management unit 203 notifies the first radio communication processing unit 201 of the timing/the frequency channel/the Duration field (NAV period) for the transmission of the RTS frame/the CTS frame configured by the packet transmission timing of the BLE. Then, the first radio transmission and/or reception unit 2011/the first higher layer processing unit 2012 perform each processing based on these timing/frequency channel/Duration field.

The radio channel management unit 203 can also configure a timing when polling packet is transmitted based on the timing/the frequency channel/the Duration field for the transmission of the RTS frame/the CTS frame acquired from the first higher layer processing unit 2012. In this case, the radio channel management unit 203 notifies the second radio communication processing unit 202 of the tinting when the polling packet is transmitted. Then, the second radio transmission and/or reception unit 2021/the second higher layer processing unit 2022 perform each processing based on this timing when the polling packet is transmitted.

The radio channel management unit 203 can configure transmit power of the RTS frame/the CTS frame for the packet transmission of the BLE. The radio channel management unit 203 can make the transmit power of the RTS frame/the CTS frame for the packet transmission of the BLE the same as transmit power of the RTS frame/the CTS frame for the data transmission of the wireless LAN. In this case, for the coverage in which the communication through the wireless LAN can be performed (10a in FIG. 1), the medium reservation for the BLE can be made. The coverage in which the communication through the BLE can be performed (20-1a and 20-2a in FIG. 1) is smaller than the coverage in which the communication through the wireless LAN can be performed. Accordingly, by a specific communication device equipped with the wireless LAN and the BLE making the medium reservation (NAV period configuration), in the BLE communication of the communication devices in the periphery thereof as well, interference from the wireless LAN can be reduced.

The radio channel management unit 203 can make the transmit power of the RTS frame/the CTS frame for the packet transmission of the BLE different from the transmit power of the RTS frame/the CTS frame for the data transmission of the wireless LAN. For example, the transmit power of the RTS frame/the CTS frame for the packet transmission of the BLE is configured to be smaller than the transmit power of the RTS frame/the CTS frame for the data transmission of the wireless LAN. With this configuration, in accordance with the difference between the transmit power of the wireless LAN and the transmit power of the BLE (in accordance with the difference between the connectable ranges of the wireless LAN and the BLE), the range of the communication device in which the transmission is prohibited can be configured. Note that, the radio channel management unit 203 can change the transmit power in accordance with whether to be the RTS frame/the CTS frame for the data transmission of the wireless LAN or the RTS frame/the CTS frame for the packet transmission of the BLE.

In FIG. 2, each of the communication devices 31 and 32 includes an antenna unit 300, the second radio transmission and/or reception unit 301, and the second higher layer processing unit 302. The second radio transmission and/or reception unit 301 has the same transmission/reception processing function as that of the second radio transmission and/or reception unit 2021. Each of the communication devices 31 and 32 transmits a response packet with respect to the polling packet transmitted by the master node based on the effective connection interval. The second higher layer processing unit 302 reads the polling packet transmitted by the communication device 20 from the second radio transmission and/or reception unit 301. In a case that the polling packet includes a read request, the second higher layer processing unit 302 inputs response data in the second radio transmission and/or reception unit 301. Additionally, the second higher layer processing unit 302 generates the advertisement packet, and inputs the generated packet in the second radio transmission and/or reception unit 301.

Figure 3:
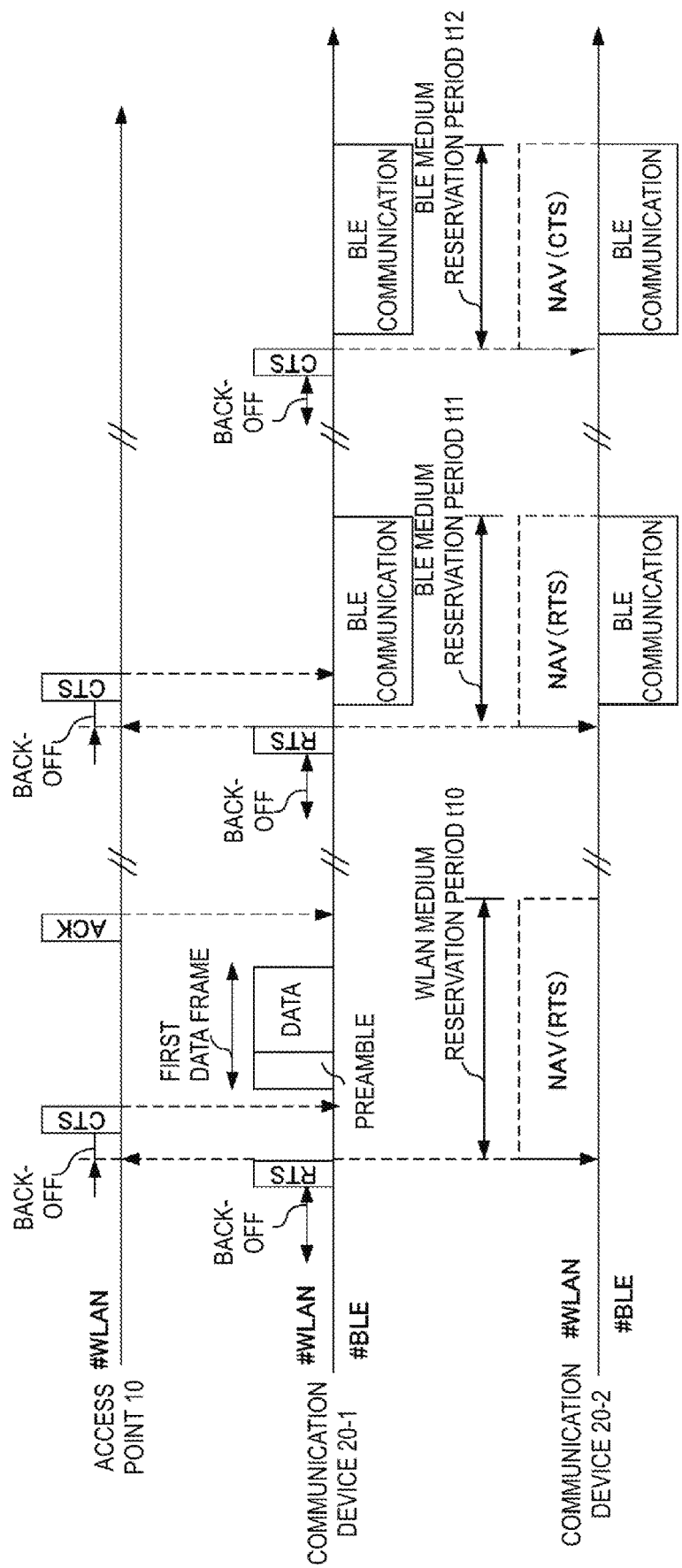
FIG. 3 is a diagram illustrating a configuration example of a medium reservation period of the communication device according to the first embodiment.

FIG. 3 is a diagram illustrating a configuration example of a medium reservation period of the communication device according to the present embodiment. In FIG. 3, a period t10 is a period in which the communication device 20-1 equipped with the wireless LAN (WLAN) and the BLE makes the medium reservation for communicating through the wireless LAN. The communication device 20-1 transmits the RTS/the CTS as a signal indicating that the radio wave of the prescribed frequency band is used. A period t11 is a period in which the communication device 20-1 equipped with the wireless LAN and the BLE makes the medium reservation for communicating through the BLE using the RTS.

The communication device 20-1 transmits the RTS after prescribed back-off (for example, Distributed coordination function Inter Frame space (DIFS)). The communication device 20-2 that has received the RTS suppresses transmission of the wireless LAN/the BLE in the NAV (RTS) period based on a value of the Duration field included in the RTS. The access point 10 that has received the RTS transmits the CTS after prescribed back-off (for example, Short Inter Frame space (SIFS)). The communication device 20-1 that has received the CTS transmits the data frame of the wireless LAN to the access point 10 in the period t10. The communication device 20-1 that has received the CTS performs the BLE communication in the period t11. Note that, the preamble is a known signal used for the channel estimation, the timing detection, or the like.

In FIG. 3, a period t12 is a period in which the communication device 20-1 equipped with the wireless LAN and the BLE makes the medium reservation for communicating through the BLE using the CTS. The communication device 20-1 transmits the CTS (CTS to itself) after prescribed back-off. The communication device 20-2 that has received the CTS suppresses transmission of the wireless LAN in the NAV (CTS) period based on a value of the Duration field included in the CTS. The communication device 20-1 transmits the CTS, and then performs the BLE communication in the period t12. Note that, in a case that the timing of the medium reservation for the transmission of the data frame using the wireless LAN and the timing of the medium reservation of the BLE collide with each other, the transmission of the data frame using the wireless LAN may be preferentially used.

In the periods t11 and t12, the communication device 20-1 communicates with the communication device 31 using the BLE. With this configuration, the communication device 20-1 can suppress the interference from the wireless LAN in the communication using the BLE. Additionally, the communication device 20-1 makes the medium reservation for the coverage in which the communication through the wireless LAN can be performed (10a in FIG. 1) by the transmission of the RTS/the CTS. The communication device 20-2 that has received the RTS/the CTS communicates with the communication device 32 using the BLE in the NAV period of the wireless LAN. With this configuration, by a specific communication device equipped with the wireless LAN and the BLE making the medium reservation, in the BLE communication of the communication devices in the periphery thereof, the interference from the wireless LAN can be reduced.

Figure 4:
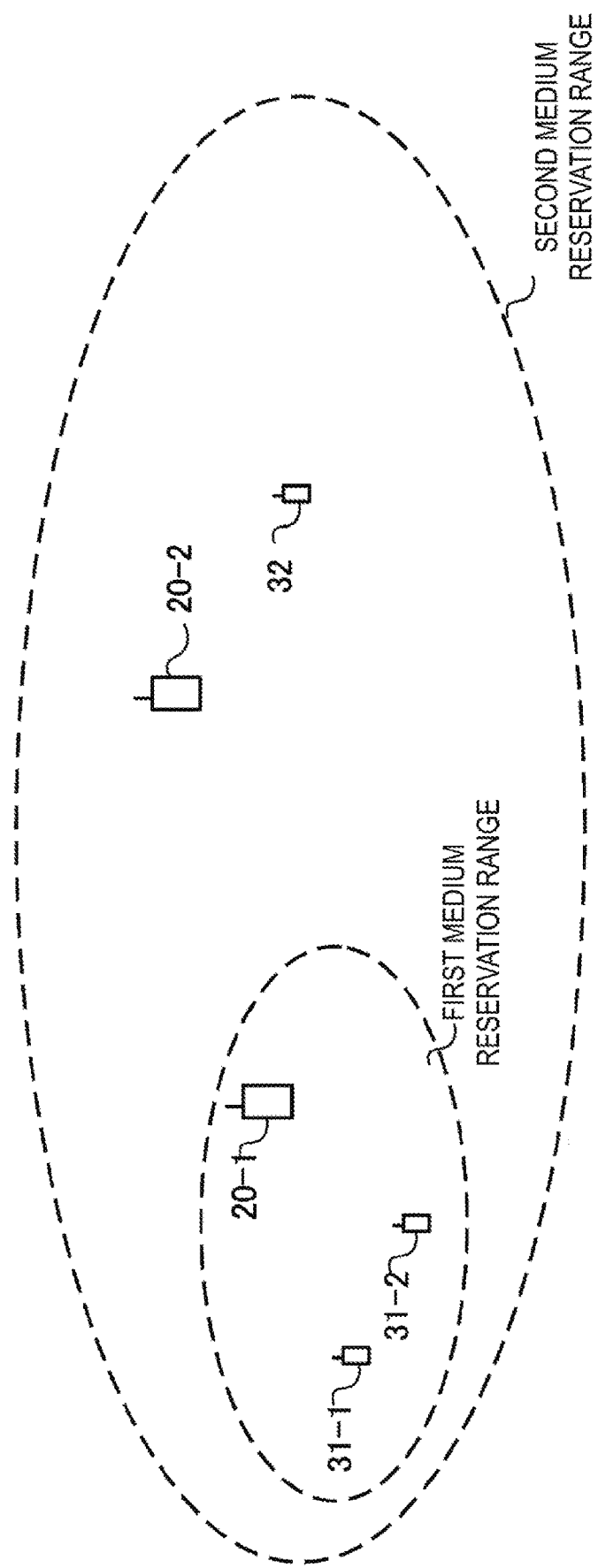
FIG. 4 is a diagram illustrating a configuration example of a medium reservation range of the communication device equipped with a wireless LAN and BLE according to the first embodiment.

FIG. 4 is a diagram illustrating a configuration example of the medium reservation range of the communication device equipped with the wireless LAN and the BLE according to the present embodiment. The radio channel management unit 203 of the communication device 20-1 can vary the configuration of the transmit power of the RTS frame/the CTS frame for the packet transmission of the BLE. A first medium reservation range is, in a case that the communication device 20-1 transmits the RTS frame/the CTS frame with first transmit power, a range in which the medium reservation can be made for the BLE. A second medium reservation range is, in a case that the communication device 20-1 transmits the RTS frame/the CTS frame with second transmit power, a range in which the medium reservation can be made for the BLE. The second transmit power is larger than the first transmit power.

For example, in a case that the communication devices 31-1 and 31-2 are in an environment in which there is not influence of the interference from the wireless LAN from the other communication device 20-2 (in a case that the communication device 20-1 performs the BLE communication with the communication devices 31-1 and 31-2 at a short distance), the communication device 20-1 transmits the RTS frame/the CTS frame with the first transmit power. In a case that the communication devices 31-1 and 31-2 are in an environment in which there is the influence of the interference from the wireless LAN from the other communication device 20-2, the communication device 20-1 transmits the RTS frame/the CTS frame with the second transmit power. Alternatively, in a case that the communication device 20-1 also makes the medium reservation for the communication device 32 in a range of the BLE connectable of the other communication device 20-2 (in a case that the communication devices 31-1, 31-2, and 32 perform the BLE communication), the RTS frame/the CTS frame are transmitted with the second transmit power. As described above, by the specific communication device equipped with the wireless LAN and the BLE controlling the range of the medium reservation for the BLE, in accordance with the environment of the radio network using the BLE communication, it is possible to reduce the interference from the wireless LAN, and suppress the data transmission from delaying.

Figure 5:
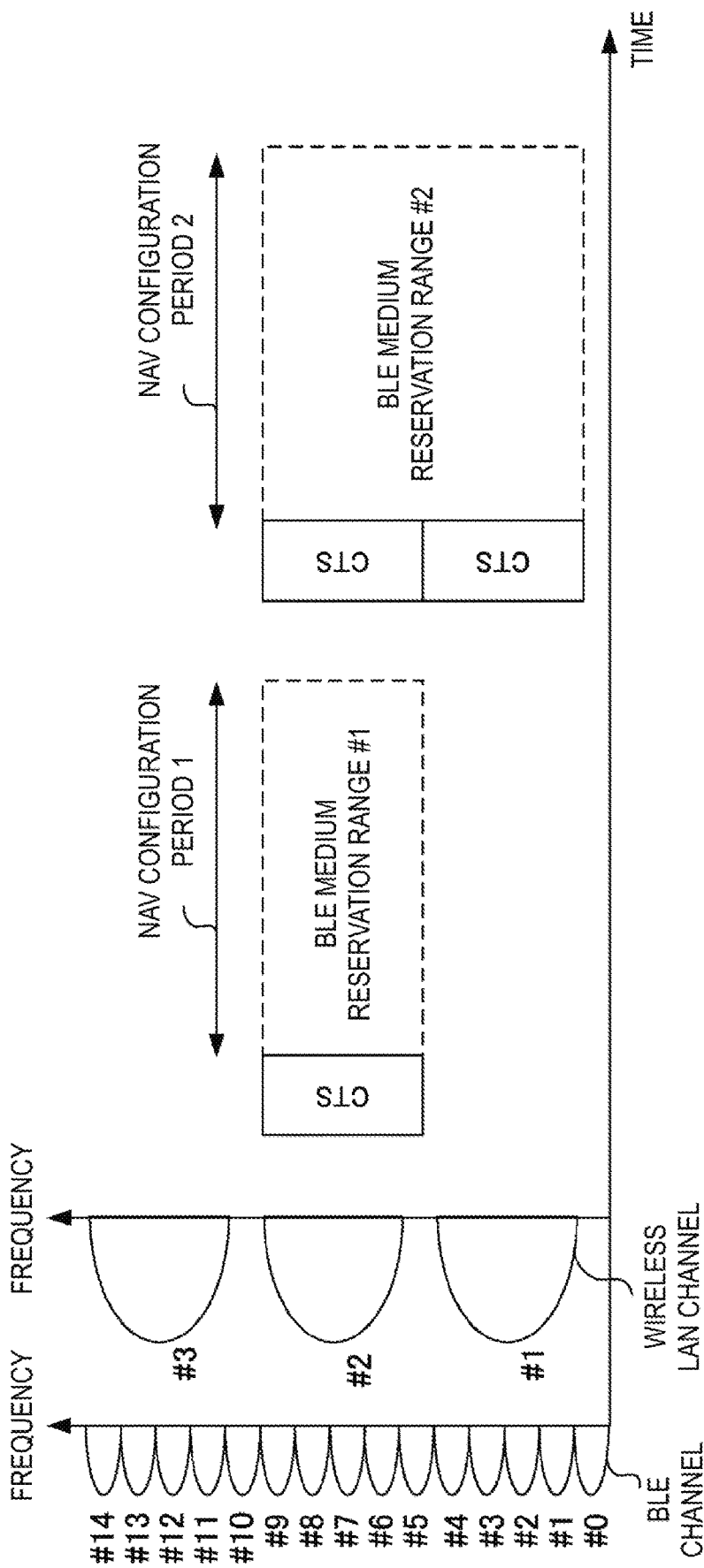
FIG. 5 is a diagram illustrating a configuration example of a range in which the communication device equipped with the wireless LAN and the BLE according to the first embodiment transmits CTS.

FIG. 5 is a diagram illustrating a configuration example of a range in which the communication device equipped with the wireless LAN and the BLE according to the present embodiment transmits the CTS. The use frequency bands of the wireless LAN channel and the BLE channel overlap. In FIG. 5, the BLE medium reservation range #1 is a medium reservation range in a case that the communication device 20-1 transmits the CTS to a frequency channel #2 of the wireless LAN. In this case, the communication device 20-1/the communication device 20-2 perform the BLE communication (frequency hopping) with the communication device 31/the communication device 32 in a range of the wireless LAN channel #2 (the BLE channel #5 to #10 in FIG. 5). The BLE medium reservation range #2 is a medium reservation range in a case that the communication device 20-1 transmits the CTS to frequency channels #1 and #2 of the wireless LAN. In this case, the communication device 20-1/the communication device 20-2 perform the BLE communication (frequency hopping) with the communication device 31/the communication device 32 in a range of the frequency channels #1 and #2 (the BLE channel #0 to #10 in FIG. 5). The communication device 20-1 can select the frequency channel/the number of the frequency channels in which the CTS is transmitted in accordance with the number of the communication devices that communicate using the BLE. Note that, in a case that the medium reservation is not made for the BLE, the communication device 20-1 can perform the BLE communication using a channel not overlapping with the wireless LAN (for example, the BLE channel #0, #5, and #10 in FIG. 5).

Figure 6:
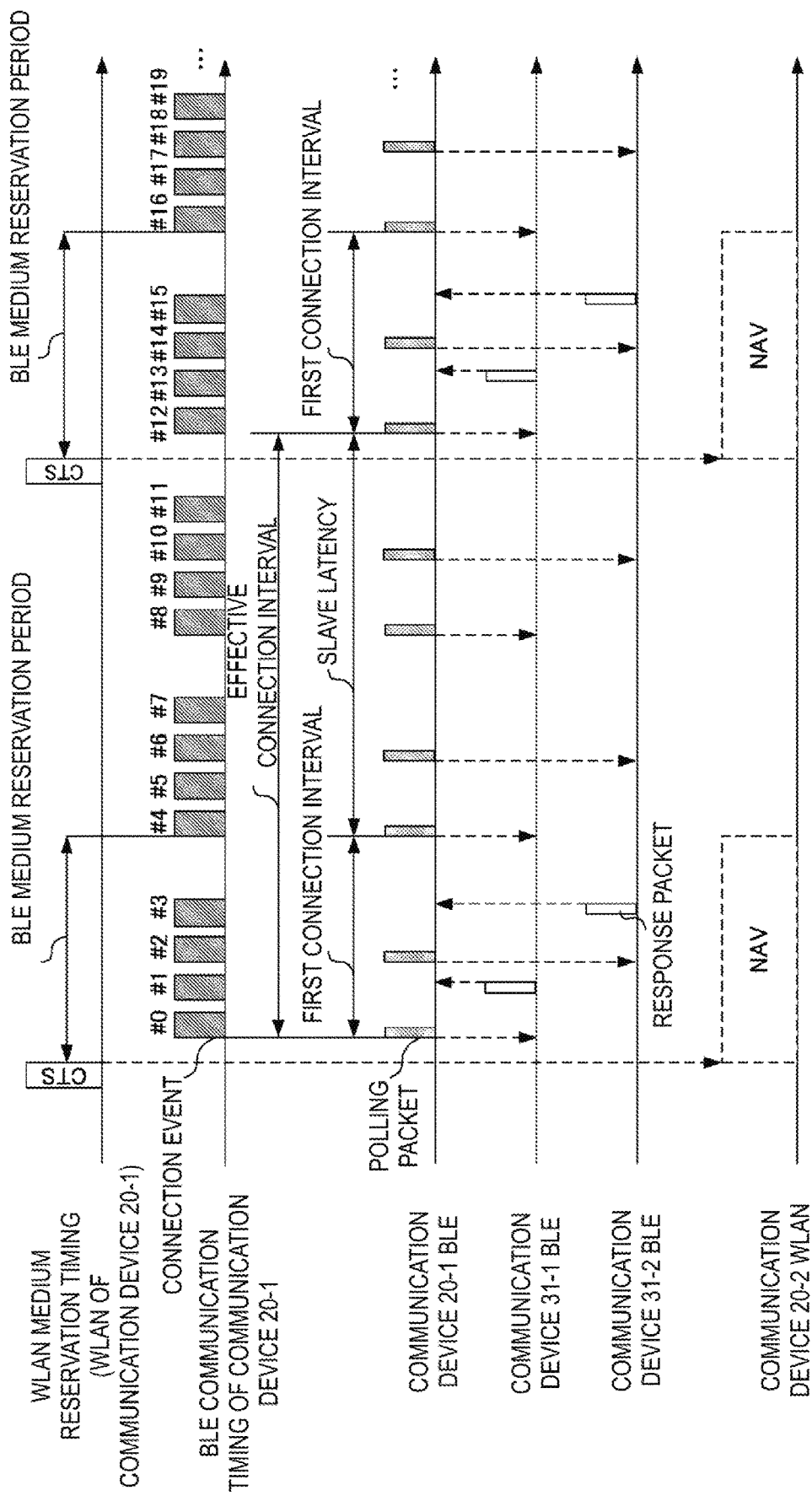
FIG. 6 is a diagram illustrating a configuration example of a communication timing of the BLE and the medium reservation period of the communication device equipped with the wireless LAN and the BLE according to the first embodiment.
Figure 7:
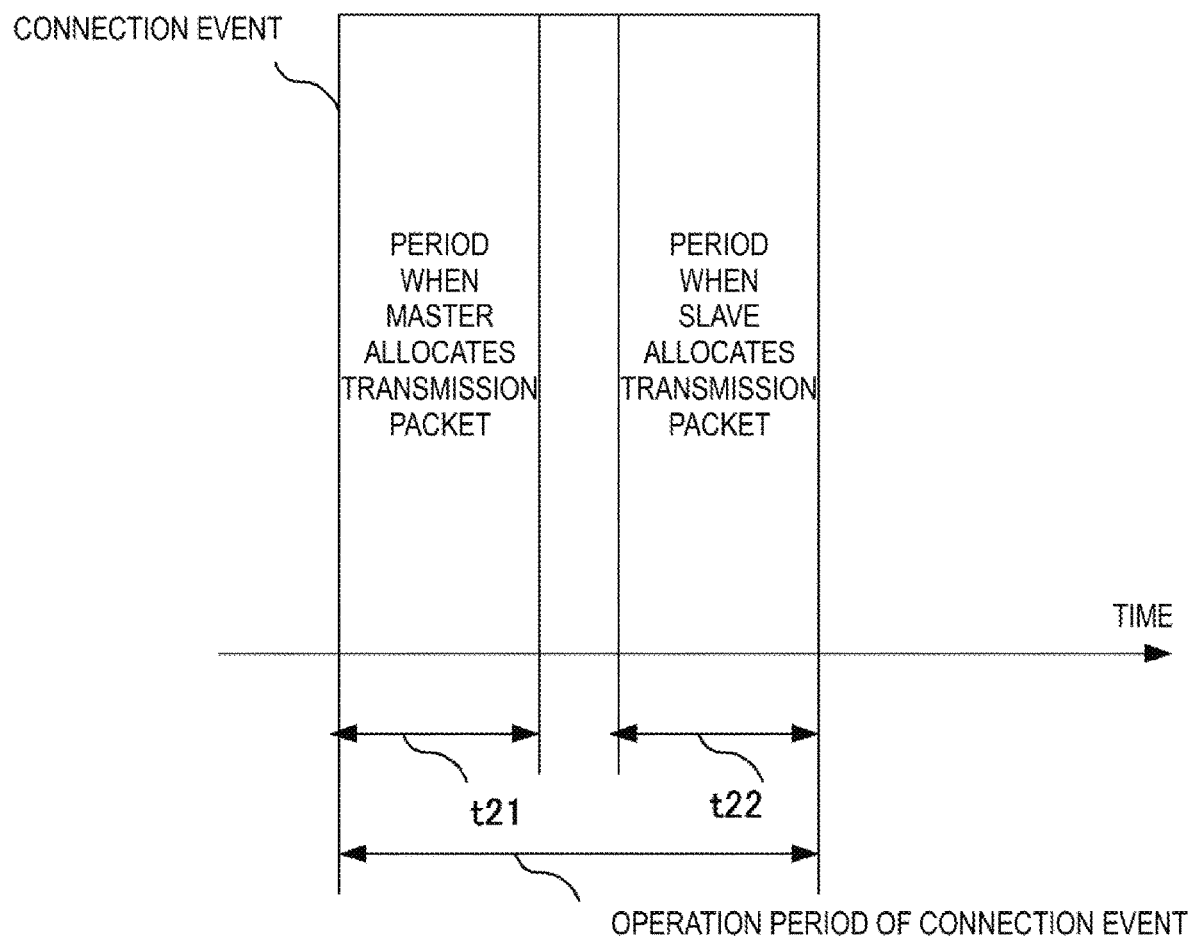
FIG. 7 is a diagram illustrating a constitution example of an operation period of a connection event according to the first embodiment.

FIG. 6 is a diagram illustrating a configuration example of the communication timing of the BLE and the medium reservation period of the communication device equipped with the wireless LAN and the BLE according to the present embodiment. In FIG. 6, portions of rightward-ascending diagonal lines indicate the connection events. In the BLE communication timing of the communication device 20-1, the connection events are iterated at prescribed intervals. The data channel is allocated to each of the connection events (for example, any one of the data channels #0 to #36 is allocated). The connection event is an operation period of the BLE radio communication of the data channel. FIG. 7 is a diagram illustrating a constitution example of the operation period of the connection event according to the present embodiment. The operation period of the connection event is constituted of a period t21 in which the master device transmits the packet to the slave device and a period t22 in which the slave device transmits the packet to the master device. For example, in the period t21, the polling packet is transmitted. In the period t22, a response packet to the polling packet is transmitted.

In FIG. 6, shaded portions indicate the polling packets that are transmitted by the communication device 20-1 (master device) to the communication device 31 (slave device). Outline portions indicate the response packets that are transmitted by the communication device 31 (slave device) to the communication device 20-1 (master device). The connection interval is an interval at which the master device communicates with the identical slave device. The communication device 20-1 transmits the polling packets to the communication device 31-1 at the connection events #0, #4, #8, #12, and #16, respectively.

In FIG. 6, the communication device 20-1 transmits the polling packets including the read request (signals requesting the transmission) to the communication device 31-1 at the connection events #0 and #12, respectively. The interval at which the communication device 20-1 transmits the connection event including the polling packet to the communication device 31-1 is called a first connection interval. The communication device 20-1 transmits the polling packets including the read request at the connection events #0 and #12, respectively. The communication device 20-1 transmits the polling packets including the Empty PDU at the connection events #4, #8, and #16, respectively. The communication device 31-1 transmits the response packets with respect to the polling packets received at the connection events #0 and #12, respectively. The communication device 31-1 ignores the polling packets respectively received at the connection events #4, #8, and #16. The effective connection interval is an interval at which the polling packet including the read request is transmitted. The slave latency is the number of continuous times when the connection events are ignored (the number of times the polling packets including the Empty PDU are continuously transmitted). In FIG. 6, the slave latency=2 is satisfied.

The communication device 20-1 configures to transmit the polling packet including the read request to the communication device 31-2 at the first connection interval. In FIG. 6, the communication device 20-1 transmits the polling packets to the communication device 31-2 at the connection events #2, #6, #10, #14, and #18, respectively. The communication device 20-1 transmits the polling packets including the read request to the communication device 31-2 at the connection events #2 and #14, respectively.

The communication device 20-1 configures the connection interval/the slave latency. The communication device 20-1 can calculate the effective connection interval from the connection interval/the slave latency. The communication device 20-1 configures the timing when the polling packet including the read request is transmitted (the connection events #0, #2, #12, and #14 in FIG. 6) using the connection interval/the slave latency/the effective connection interval. The communication device 20-1 transmits the CTS frame in the wireless LAN in synchronization with the effective connection interval (transmission timing of the connection events #0 and #12). The communication device 20-1 configures the NAV period (radio medium reservation period for the BLE) that is not less than the period of the first connection interval in the Duration field of this CTS frame. FIG. 6 illustrates an example in a case that the period of the first connection interval is configured to the NAV period. The communication device 20-2 that has received the CTS frame prohibits the transmission of the wireless LAN in the NAV period. With this configuration, the communication device 20-1 can reduce the interference from the wireless LAN and prevent the response packet from disappearing in the period of the BLE communication with the communication device 31.

The communication device 20-1 can also configure the connection interval/the slave latency after configuring the NAV period. The communication device 20-1 configures the connection interval/the slave latency such that the polling packet including the read request can be transmitted in the configured prescribed NAV period.

The communication device 20-2 transmits the polling packet including the read request to the communication device 32 that performs the BLE communication with the device itself in the period of the first connection interval. With this configuration, by the communication device 20-1 making the medium reservation for the BLE, the interference to the BLE communication of the communication device 20-2 that is present in the periphery of the communication device 20-1 can also be reduced.

FIG. 6 illustrates a case that the communication device 31 transmits the response packet at a connection event next to the connection event at which the polling packet including the read request is received. The communication device 31 can also transmit the response packet at the connection event at which the next polling packet including the read request is received. In this case, the communication device 20-1 can configure the radio medium reservation period for the BLE in the period of the connection event at which the polling packet including the read request is received.

Figure 8:
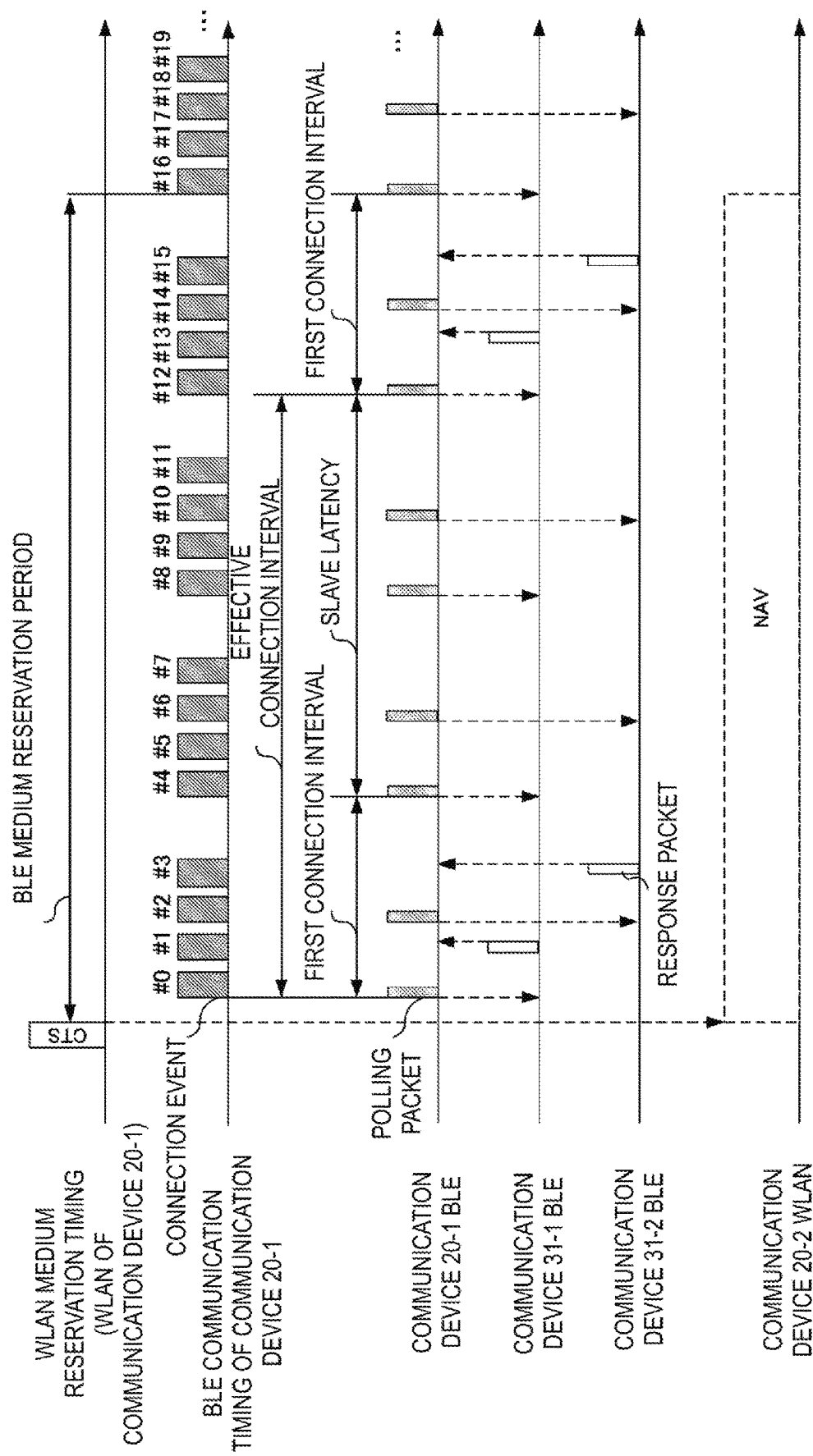
FIG. 8 is a diagram illustrating another configuration example of the communication timing of the BLE and the medium reservation period of the communication device equipped with the wireless LAN and the BLE according to the first embodiment.

FIG. 8 is a diagram illustrating another configuration example of the communication timing of the BLE and the medium reservation period of the communication device equipped with the wireless LAN and the BLE according to the present embodiment. In FIG. 8, the communication device 20-1 transmits the polling packet including the read request to the communication devices 31-1 and 31-2 at the same BLE communication timing as that in FIG. 6. The communication device 20-1 transmits the CTS frame in the wireless LAN in synchronization with the effective connection interval. The communication device 20-1 configures the NAV period (radio medium reservation period for the BLE) over a period of the prescribed number of the first connection intervals in the Duration field of the CTS frame. FIG. 6 illustrates an example in which a period over two times continuous first connection intervals is configured to the NAV period.

With this configuration, by the communication device 20-1 making the medium reservation for the BLE, even in a case that the timing of the BLE communication of the communication device 20-2 is different from the timing of the BLE communication of the communication device 20-1, the interference to the BLE communication of the communication device 20-2 that is present in the periphery of the communication device 20-1 can also be reduced. Note that, the communication device 20-1 can also configure the NAV period over a period of the prescribed number of the continuous effective connection intervals in the Duration field of the CTS frame.

Figure 9:
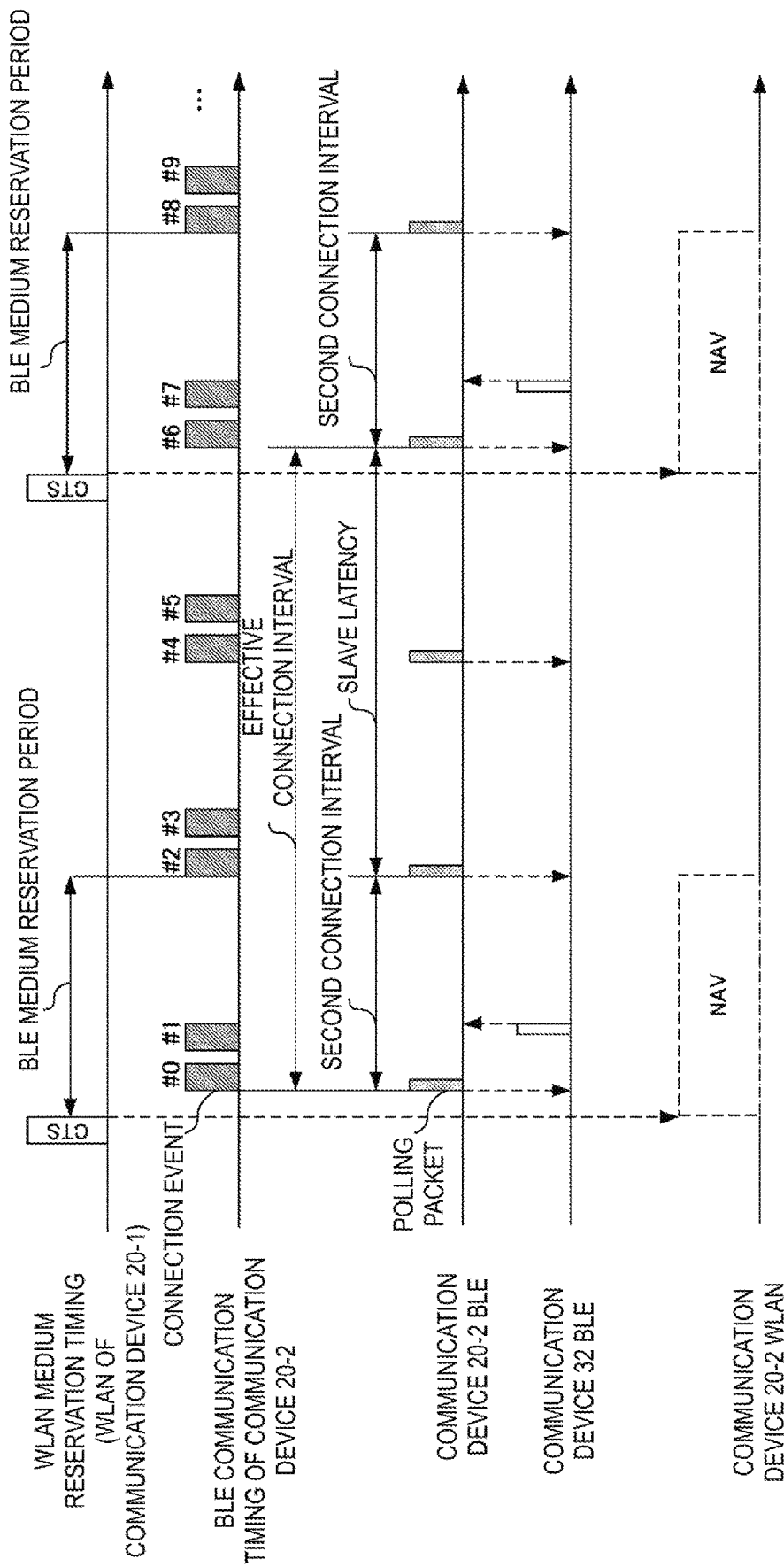
FIG. 9 is a diagram illustrating another configuration example of the communication timing of the BLE and the medium reservation period of the communication device equipped with the wireless LAN and the BLE according to the first embodiment.

FIG. 9 is a diagram illustrating another configuration example of the communication timing of the BLE and the medium reservation period of the communication device equipped with the wireless LAN and the BLE according to the present embodiment. The communication device 20-2 is present in the periphery of the communication device 20-1 that makes the medium reservation. Portions of rightward-ascending diagonal lines indicate the connection events. In the BLE communication timing of the communication device 20-2, the connection events are iterated at prescribed intervals. The data channel is allocated to each of the connection events in accordance with a prescribed pattern (#0, #1, . . . , #9, . . . in FIG. 9 are examples of channel IDs of the data channels allocated to the connection events). Note that, a number associated with a radio frequency channel can be allocated to the data channel.

In FIG. 9, shaded portions indicate the polling packets that are transmitted by the communication device 20-2 (master device) to the communication device 32 (slave device). Outline portions indicate the response packets that are transmitted by the communication device 32 (slave device) to a communication device 21 (master device). The communication device 20-2 transmits the polling packets to the communication device 32 at the connection events #0, #2, #4, #6, and #8, respectively.

In FIG. 9, the communication device 20-2 transmits the polling packets including the read request to the communication device 32 at the connection events #0 and #6, respectively. The interval at which the communication device 20-2 transmits the connection event including the polling packet to the communication device 32 is called a second connection interval. The communication device 20-2 transmits the polling packets including the Empty PDU at the connection events #2, #4, and #8, respectively. The communication device 32 transmits the response packets with respect to the polling packets received at the connection events #0 and #6, respectively. The communication device 32 ignores the polling packets respectively received at the connection events #2, #4, and #8. In FIG. 9, the slave latency=2 is satisfied.

In FIG. 9, the communication device 20-1 configures the timing when the polling packet including the read request is transmitted while taking the first connection interval (FIG. 6) and the second connection interval into consideration. The communication device 20-1 transmits the CTS frame in the wireless LAN in synchronization with the effective connection interval in the BLE communication of the device itself (transmission timing of the connection events #0 and #12 in FIG. 6). The communication device 20-1 configures the NAV period (radio medium reservation period for the BLE) in the Duration field of this CTS frame while taking the first connection interval (FIG. 6) and the second connection interval into consideration. For example, a longer period than the other of the first connection interval and the second connection interval is configured. FIG. 9 illustrates an example in which, in a case that the second connection interval is longer than the first connection interval, the communication device 20-1 configures the period of the second connection interval to the NAV period. With this configuration, by the communication device 20-1 making the medium reservation for the BLE, the interference to the BLE communication of the communication device 20-2 that is present in the periphery of the communication device 20-1 can also be reduced.

Figure 10:
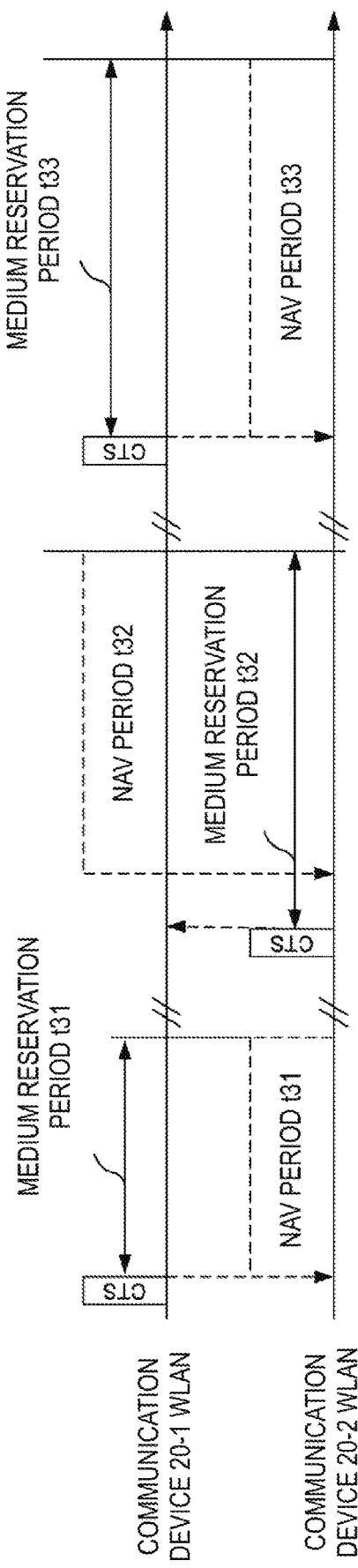
FIG. 10 is a diagram illustrating another configuration example of the medium reservation period of the communication device according to the first embodiment.

FIG. 10 is a diagram illustrating another configuration example of the medium reservation period of the communication device according to the present embodiment. In FIG. 10, the communication device 20-1 equipped with the wireless LAN and the BLE transmits the CTS frame in the wireless LAN and secures a medium reservation period t31. The Duration field of this CTS frame is configured to a period that the communication device 20-1 desires to secure for the BLE communication. The communication device 20-2 that has received the CTS configures the medium reservation period t31 to an NAV period t31. In the medium reservation period t31, the communication device 20-1 performs the BLE communication.

The communication device 20-2 equipped with the wireless LAN and the BLE transmits the CTS frame in the wireless LAN and secures a medium reservation period t32. The communication device 20-1 that has received the CTS configures the medium reservation period t32 to an NAV period t32. At this time, the communication device 20-1 acquires the NAV period t32 that the communication device 20-2 requires. In the medium reservation period t32, the communication device 20-1 and the communication device 20-2 can perform the BLE communication. The communication device 20-1 can monitor a communication situation (transmission frequency or the like) in the NAV period t32.

The communication device 20-1 configures the Duration field in the CTS transmitted for making the medium reservation next while taking the period that the device itself desires to secure for the BLE communication (NAV period t31) and the NAV period received from the other device (NAV period t32) into consideration. For example, the communication device 20-1 configures, in the Duration field, a longer period than the other of the period that the device itself desires to secure for the BLE communication and the NAV period received from the other device. In FIG. 10, the NAV period received from the other device (NAV period t32) is longer than the period that the device itself desires to secure for the BLE communication (the NAV period t31). In this case, the communication device 20-1 configures a period based on the NAV period t32 in the Duration field.

In FIG. 10, a medium reservation period t33 secured by the communication device 20-1 has the same length as that of the NAV period t32. The communication device 20-1 that has received this CTS configures the medium reservation period t33 to an NAV period t33. In the medium reservation period t33, the communication device 20-1 and the communication device 20-2 can perform the BLE communication.

As described above, in a case that there are the multiple communication devices equipped with the wireless LAN and the BLE, by the communication devices performing the radio medium in cooperation with each other, the interference with respect to the BLE communication can be reduced in a wide range.

Figure 11:
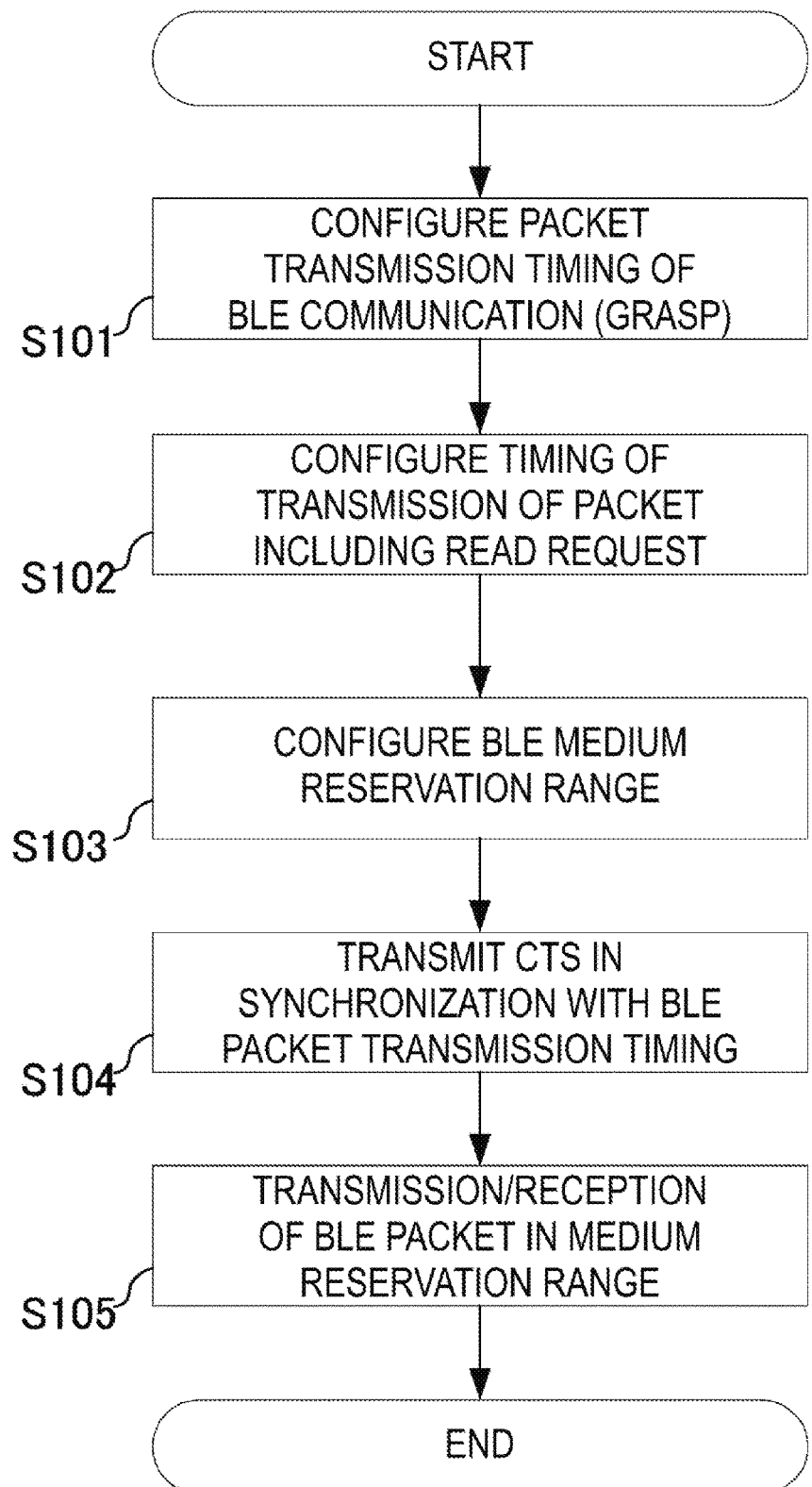
FIG. 11 is a diagram illustrating an operation flow example of the communication device equipped with the wireless LAN and the BLE according to the first embodiment.

FIG. 11 is a diagram illustrating an operation flow example of the communication device equipped with the wireless LAN and the BLE according to the present embodiment. The communication device 20-1 configures the packet transmission timing for performing the BLE communication with the communication device 31 (S101). The packet transmission timing is configured by the connection interval/ the slave latency/the effective connection interval. Next the communication device 20-1 configures the timing when the packet including the read request is transmitted to the communication device 31 (S102).

The communication device 20-1 configures the medium reservation range (frequency/time) based on the transmission timings configured at S101 and S102 (S103). At this time, a communication situation of the communication terminal 20-2 in the periphery can also be taken into consideration. Thereafter, in a case that the packet transmission timing of the BLE approaches, the CTS is transmitted in synchronization with the timing (S104).

The communication device 20-1 transmits, after transmitting the CTS, the polling packets including the read request of the BLE communication in the medium reservation range (S105). Additionally, the response packet with respect to the polling packet including the read request is received (S105).

Second Embodiment

In the present embodiment, the radio medium reservation for the BLE communication in a case that the communication device includes an identifier of the wireless LAN will be described. Note that, descriptions of the same portions as in the first embodiment will be omitted.

In a radio communication network according to the present embodiment, multiple networks of the wireless LAN are constituted of the access points and the communication devices. A Service Set Identifier (SS ID) for identifying the network of the wireless LAN is allocated to each of the communication devices. The service set identifier is an identifier indicating a network group in the wireless LAN (mutually communicating radio node groups).

The communication device can connect to an access point having the same service set identifier. The communication device can connect to a communication device having the same service set identifier. As the service set identifier, a Basic Service Set Identifier (BSS ID) and an Extended Service Set Identifier (ESS ID) can be used.

Figure 12:
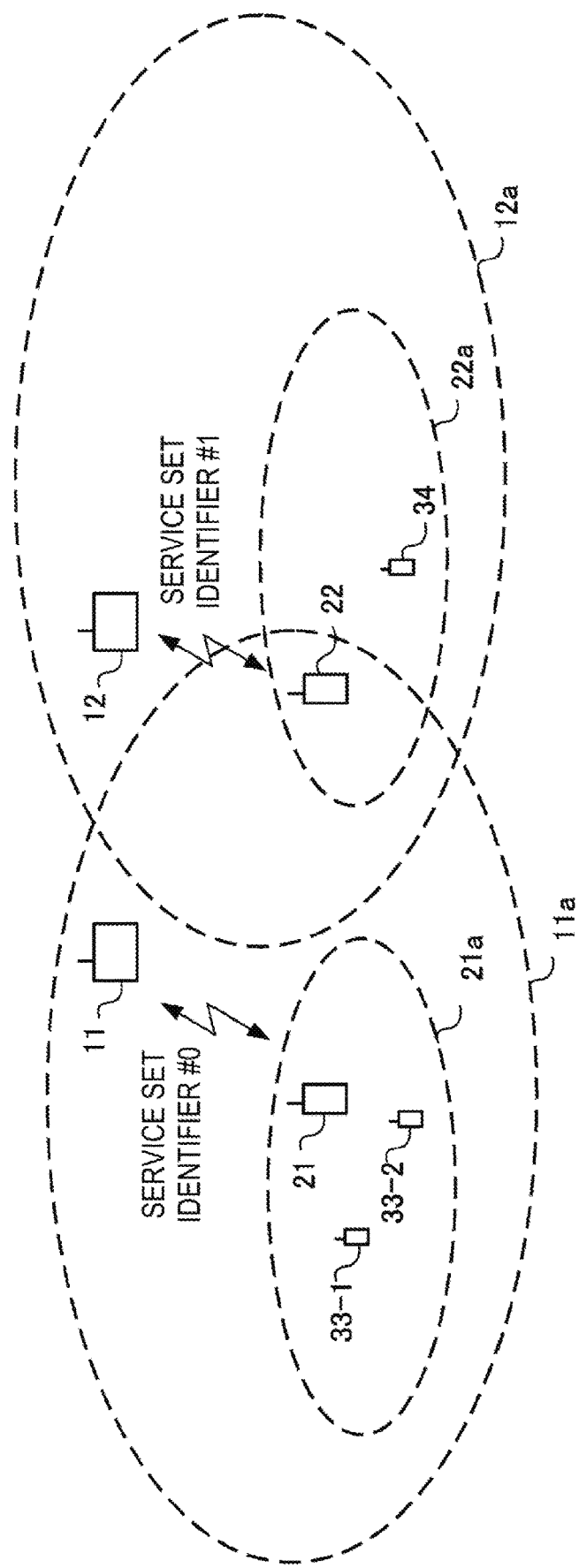
FIG. 12 is a diagram illustrating a constitution example of a radio communication network according to a second embodiment.

In the radio communication network according to the present embodiment, multiple radio node groups in the wireless LAN can be constituted of the multiple access points and the multiple communication devices. FIG. 12 is a diagram illustrating a constitution example of the radio communication network according to the present embodiment. In FIG. 12, different service set identifiers are allocated to an access point 11 and an access point 12, respectively. The access point 11 and a communication device 21 constitute one radio node group. A service set identifier #0 is allocated to the access point 11 and the communication device 21. Additionally, the access point 12 and a communication device 22 constitute another radio node group. A service set identifier #1 is allocated to the access point 12 and the communication device 22. Each of the communication devices 21 and 22 is equipped with the wireless LAN and the BLE. Coverages 11a and 12a are ranges in which the wireless LAN communication of the access points 11 and 12 can be performed, respectively. The coverages 21a and 22a are ranges in which the BLE communication of the communication device 21 and the communication device 22 can be performed, respectively. The communication device 21 connects to communication devices 33-1 and 33-2 using the BLE. The communication device 22 connects to a communication device 34 using the BLE. The access points 11 and 12 include the same constitution as that of the access point 10 (FIG. 2). The communication devices 21 and 22 include the same constitution as that of the communication device 20 (FIG. 2). A communication device 33 and the communication device 34 include the same constitution as that of the communication device 31 (FIG. 2).

In FIG. 12, each of the access points 11 and 12 transmits a management frame such as beacon including the service set identifier, a probe request, or the like. Each of the communication devices 21 and 22 configures the service set identifier of the device itself using the received beacon, or the like. Each of the communication devices 21 and 22 can know the service set identifiers of the access point in the periphery and the communication device in the periphery using the received beacon, or the like.

Each of the communication devices 21 and 22 can inquire the service set identifier of the access point. Using a response to this, each of the communication devices 21 and 22 can configure the service set identifier of the device itself. Note that, each of the communication devices 21 and 22 can have a service set identifier candidate beforehand.

Note that, in the radio network according to the present embodiment, multiple radio node groups can also be constituted of one access point and the multiple communication devices. For example, in FIG. 1, different service set identifiers are allocated to the communication devices 20-1 and 20-2 connected to the access point 10. For example, the service set identifier #0 is allocated to the access point 10 and the communication device 20-1. Additionally, the service set identifier #1 is allocated to the access point 10 and the communication device 20-2.

Figure 13:
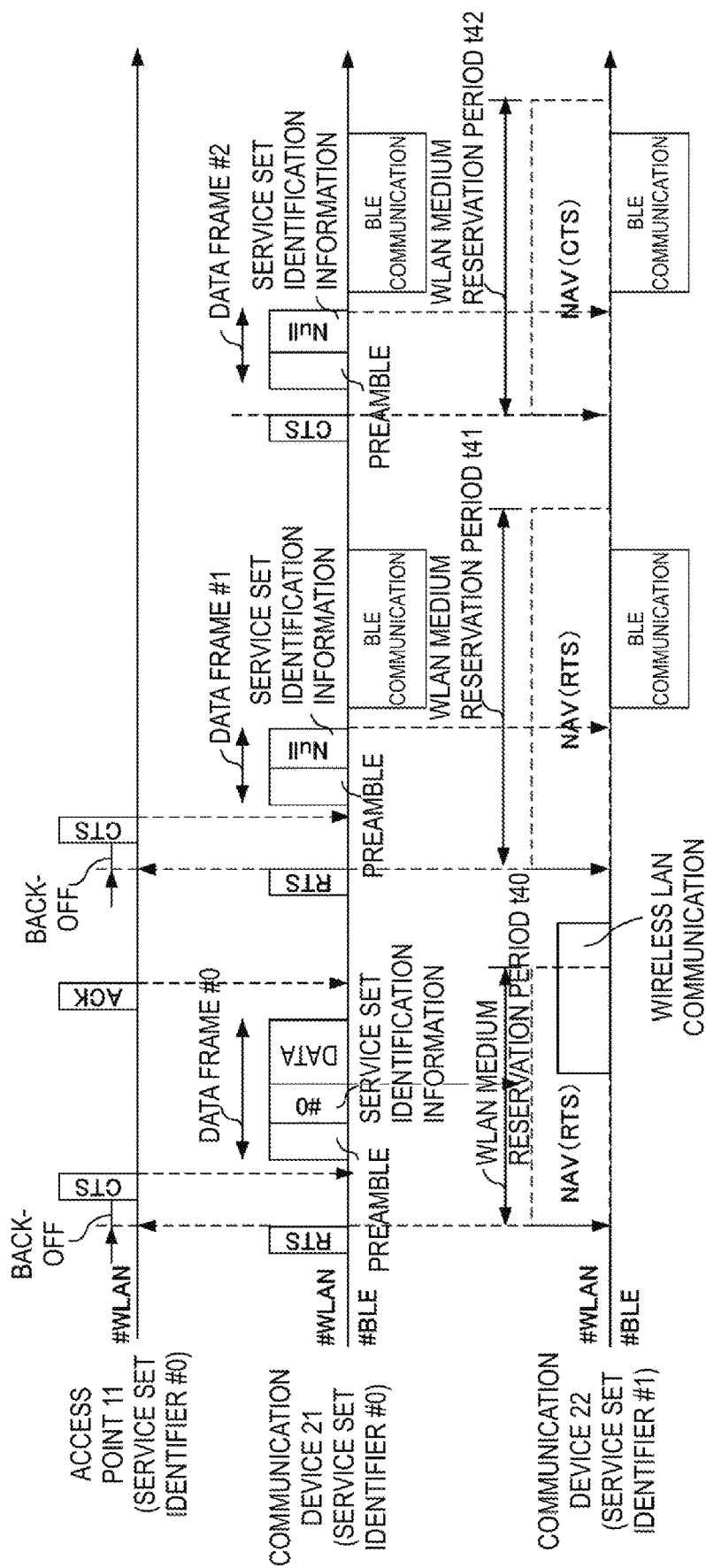
FIG. 13 is a diagram illustrating a configuration example of a medium reservation range of a communication device equipped with the wireless LAN and the BLE according to the second embodiment.

FIG. 13 is a diagram illustrating a configuration example of the medium reservation range of the communication device equipped with the wireless LAN and the BLE according to the present embodiment. In FIG. 13, the service set identifier #0 is configured in the access point 11 and the communication device 21. The service set identifier #1 is configured in the communication device 22. A period t40 is a period in which the communication device 21 equipped with the wireless LAN (WLAN) and the BLE makes the medium reservation for communicating through the wireless LAN. A period t41 is a period in which the communication device 21 makes the medium reservation for communicating through the BLE using the RTS.

The communication device 21 can read service set identification information included in the data frame transmitted by the access points 11 and 12 and the communication device 22. In the same manner, the communication device 22 can also read the service set identification information included in the data frame transmitted by the access points 11 and 12 and the communication device 21. With this configuration, the communication devices 21 and 22 can grasp the radio node group or the wireless LAN operation situation of the access point and the communication device in the periphery.

In FIG. 13, the communication device 21 transmits the RTS after prescribed back-off (for example, Distributed coordination function Inter Frame space (DIFS)). The communication device 22 that has received the RTS configures the NAV (RTS) period for suppressing the transmission of the wireless LAN/the BLE based on a value of the Duration field included in the RTS. The access point 11 that has received the RTS transmits the CTS after prescribed back-off (for example, Short Inter Frame space (SIFS)).

In FIG. 13, the communication device 21 that has received the CTS transmits a data frame #0 of the wireless LAN to the access point 11 in the period t40. The data frame according to the present embodiment includes at least a service set identification information field. An example in which the data frame #0 is constituted of the preamble, the service set identification information field, and the data field is illustrated. In the service set identification information field, the service set identifier is disposed. The service set identification information field can be included in a physical layer header in the data frame. For the service set identification information field, a basic service set color (BSS color) can be used. In the data field, user data transmitted by the access point or the communication device are disposed. Note that, the service set identification information field can also be included in an MAC layer header in the data frame.

In the communication device 21 in FIG. 13, the service set identifier #0 is written in the service set identification information field of the data frame #0. The communication device 22 that has received the data frame #0 reads the service set identification information field. In a case that the service set identification information #0 of the data frame #0 is different from the service set identifier #1 configured in the communication device 22, the communication device 22 determines that the wireless LAN communication of the device itself can be performed without waiting the NAV (RTS) period for the data frame #0. For example, the communication device 22 performs the wireless LAN communication after a prescribed inter frame space (IFS) and back-off from the service set identification information field.

In FIG. 13, the communication device 21 that has received the CTS transmits a data frame #1 of the wireless LAN to the access point 11 in the period t41. The data frame #1 is constituted of at least the preamble and the service set identification information field. The data frame #1 can be made to be a frame that does not include the data field. The communication device 21 configures information indicating that a specific service set identifier is not designated (for example, Null) in the service set identification information field of the data frame #1. The information indicating that the specific service set identifier is not designated can be made to be information indicating that a specific network is not designated.

The wireless LAN according to the present embodiment can determine a specific bit sequence as the information indicating that the specific service set identifier is not designated. For the specific bit sequence, a bit sequence that is not used as the service set identifier can be used. For example, in a case that the number of bits of the service set identification information field is six bits, "000000" to "111110" are allocated to the specific service set identifiers.

A bit sequence of all "1" is allocated to the information indicating that the specific service set identifier is not designated.

The communication device 21 may configure the service set identifier that is not used in the neighboring communication terminals instead of the information indicating that the specific service set identifier is not designated. In this case, the communication device 21 monitors the service set identifier used in the vicinity thereof, distinguishes the bit sequence that is not dynamically used as the service set identifier.

After transmitting the data frame #1, the communication device 21 communicates with the communication device 33 in the period 41 using the BLE. The communication device 22 that has received the data frame #1 reads the service set identification information field. In a case that the service set identification information of the data frame #1 is Null, the communication device 22 determines that the wireless LAN communication of the device itself cannot be performed in the NAV (RTS) period. In a case that the service set identification information is Null, the communication device 22 can communicate with the communication device 34 in the period t41 using the BLE.

In FIG. 13, a period t42 is a period in which the communication device 21 equipped with the wireless LAN and the BLE makes the medium reservation for communicating through the BLE using the CTS (CTS to self). The communication device 21 transmits the CTS after prescribed backoff. The communication device 22 that has received the CTS configures the NAV (CTS) period based on a value of the Duration field included in the CTS.

The communication device 21 transmits a data frame #2 of the wireless LAN to the access point 11 in the period t42. The data frame #2 is constituted in the same manner as the data frame #1. The communication device 21 writes Null in the service set identification information field of the data frame #2. After transmitting the data frame #2, the communication device 21 communicates with the communication device 33 in the period 42 using the BLE.

In a case that the service set identification information is Null, the communication device 22 that has received the data frame #2 determines that the wireless LAN communication of the device itself cannot be performed in the NAV (RTS) period. In a case that the service set identification information is Null, the communication device 22 communicates with the communication device 34 in the period t42 using the BLE. Note that, in the wireless LAN system according to the present embodiment, the data frame #1 and the data frame #2 may be defined as a frame of the MAC frame type that is different from the normal data frame (the data frame #0).

The communication device 21 configures the medium reservation period that is not less than the period of the frames (the data frame #1 and #2) of the wireless LAN and the BLE communication period in the Duration field of the RTS and the CTS for making the medium reservation for the BLE. The communication device 21 configures a Duration field value while taking the period of the data frames (the data frame #1 and the data frame #2) and the connection interval/the slave latency/the effective connection interval of the BLE communication into consideration in the Duration field of the RTS and the CTS for making the medium reservation for the BLE.

Figure 14:
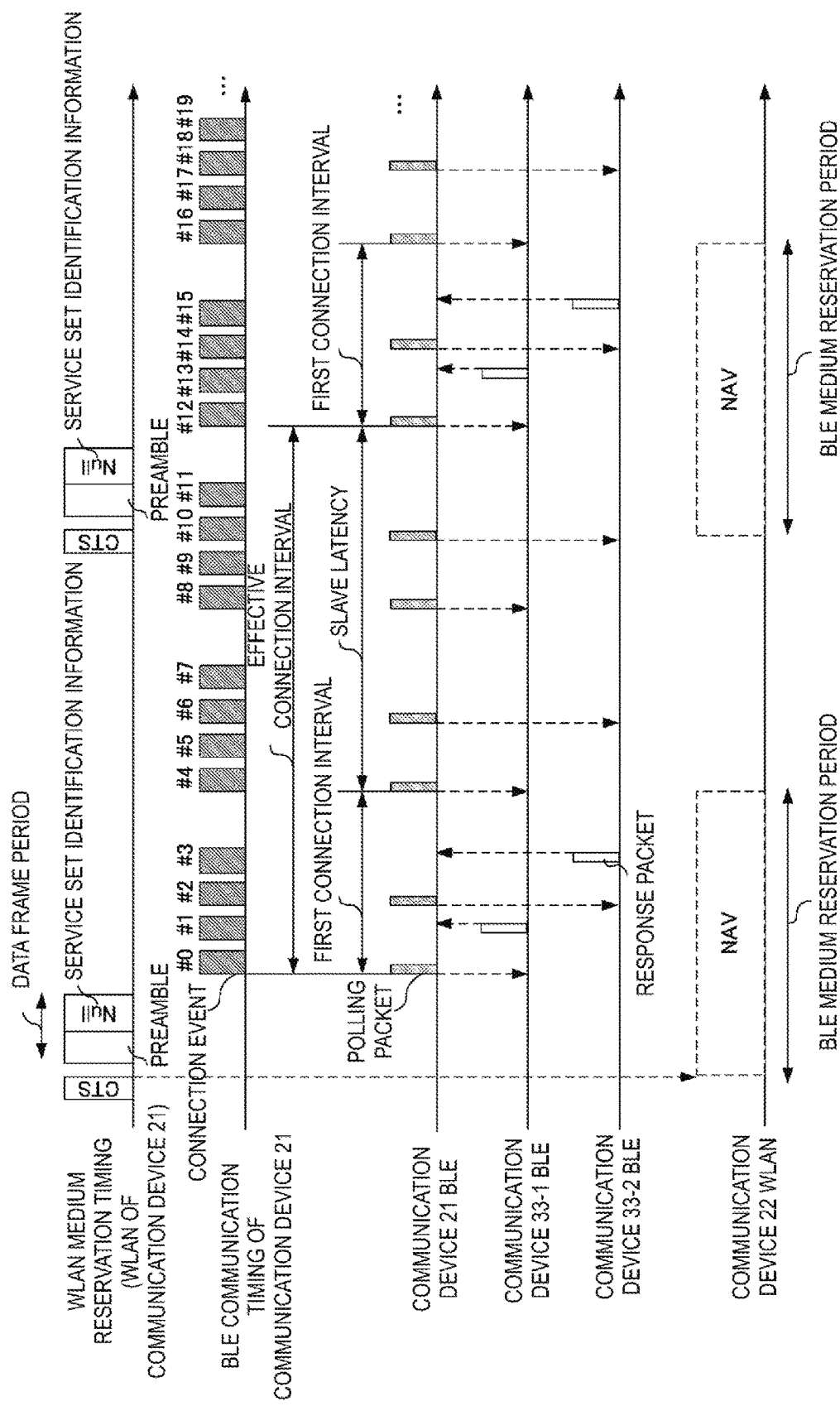
FIG. 14 is a diagram illustrating a configuration example of a communication timing of the BLE and a medium reservation period of the communication device equipped with the wireless LAN and the BLE according to the second embodiment.

FIG. 14 is a diagram illustrating a configuration example of the communication timing of the BLE and the medium reservation period of the communication device equipped with the wireless LAN and the BLE according to the present embodiment. In FIG. 14, portions of rightward-ascending diagonal lines indicate the connection events. Shaded portions indicate the polling packets that are transmitted by the communication device 21 (master device) to the communication device 33 (slave device). Outline portions indicate the response packets that are transmitted by the communication device 33 to the communication device 21.

The communication device 21 configures the connection interval/the slave latency for the BLE communication. The communication device 21 can calculate the effective connection interval from the connection interval/the slave latency. The communication device 21 configures the timings when the polling packet including the read request is transmitted (connection events #0, #2, #12, and #14 in FIG. 14) using the connection interval/the slave latency/the effective connection interval. FIG. 14 illustrates a configuration example of the connection interval/the slave latency/the effective connection interval in the same manner as FIG. 6.

The communication device 21 transmits the CTS frame in the wireless LAN in synchronization with the effective connection interval (transmission timings of the connection events #0 and #12). After the data frame period of the wireless LAN, the communication device 21 starts the connection events #0 and #12. The communication device 21 configures the NAV period (radio medium reservation period for the BLE) that is not less than the data frame period of the wireless LAN and the period of the first connection interval in the Duration field of this CTS frame. The communication device 22 that has received the CTS frame and the data frame in which Null is configured in the service set identification information prohibits the transmission of the wireless LAN in the NAV period. With this configuration, the communication device 21 can reduce the interference from the wireless LAN and prevent the response packet from disappearing in the period of the BLE communication with the communication device 31. Note that, in a case that Null is configured in the service set identification information, the communication device 22 can perform the BLE communication in the NAV period.

Third Embodiment

In the present embodiment, the radio medium reservation for the BLE communication in a case that the data frame of the wireless LAN includes a system identifier will be described. Note that, descriptions of the same portions as in the first embodiment and the second embodiment will be omitted.

Figure 15:
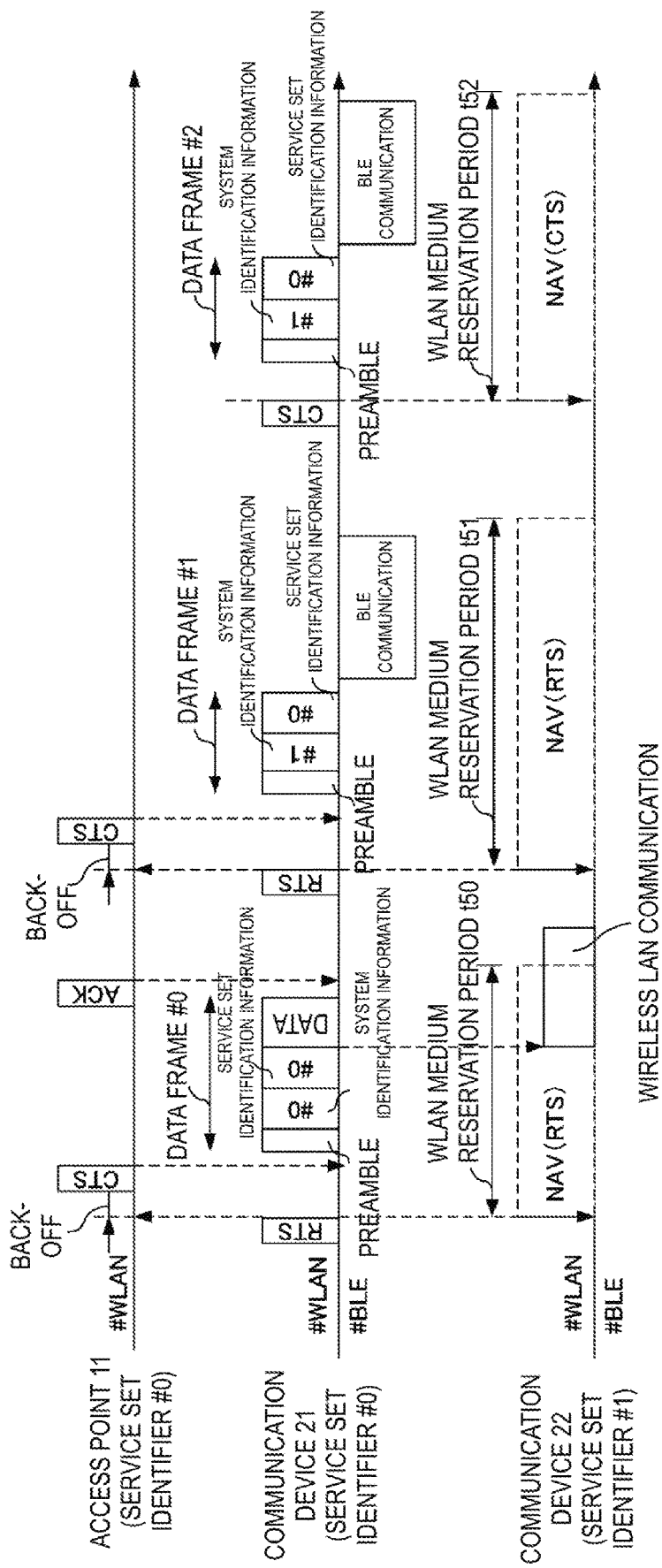
FIG. 15 is a diagram illustrating a configuration example of a medium reservation range of a communication device equipped with the wireless LAN and the BLE according to a third embodiment.

FIG. 15 is a diagram illustrating a configuration example of the medium reservation range of the communication device equipped with the wireless LAN and the BLE according to the present embodiment. In FIG. 15, a period t50 is a period in which the communication device 21 equipped with the wireless LAN and the BLE makes the medium reservation for communicating through the wireless LAN. A period t51 is a period in which the communication device 21 makes the medium reservation for communicating through the BLE using the RTS. A period t52 is a period in which the communication device 21 makes the medium reservation for communicating through the BLE using the CTS. Descriptions of the same operations as in FIG. 13 will be omitted.

The communication device 21 according to the present embodiment transmits the data frame including at least a system identification information field. The system identification information field includes information indicating whether or not the data transmission using the wireless LAN communication is performed. In FIG. 15, a system identifier #0 is an identifier indicating the presence of the wireless LAN communication (performing the data transmission using the wireless LAN). A system identifier #1 is an identifier indicating the presence of communication other than the wireless LAN communication (performing the data transmission using a communication system other than the wireless LAN). Note that, the system identification information field can also be made to be an identifier indicating whether or not the data frame includes the data field.

In FIG. 15, the communication device 21 configures the system identifier #0 in the system identification information field of the data frame #0. The communication device 22 that has received the system identifier #0 determines that the communication device 21 performs the wireless LAN communication. Next, the communication device 22 reads the service set identification information field and determines whether or not the wireless LAN communication of the device itself may be performed. In FIG. 15, the communication device 22 stores the service set identifier that is different from that of the device itself in the service set identification information field. In this case, the communication device 22 determines that the wireless LAN communication of the device itself can be performed without waiting the NAV (RTS) period for the data frame #0.

The communication device 21 configures the system identifier #1 in the system identification information field of the data frame #1. The communication device 22 that has received the system identifier #1 determines that the communication device 21 does not perform the wireless LAN communication. In this case, the communication device 22 determines that the wireless LAN communication of the device itself cannot be performed in the NAV (RTS) period. The communication device 21 communicates with the communication device 33 in the period t51 in which the BLE communication is performed, after transmitting the data frame, using the BLE.

The communication device 21 transmits the CTS frame in the wireless LAN in synchronization with the effective connection interval of the BLE. After the period of the data frame #1, the communication device 21 starts the connection event of the BLE. The communication device 21 configures a Duration field value while taking the period of the data frame #1 and the connection interval/the slave latency/the effective connection interval of the BLE communication into consideration in the Duration field of the RTS and the CTS for making the medium reservation for the BLE. For example, the communication device 21 configures the period in which the connection event including the polling packet including the read request is transmitted in the NAV period. Likewise, in a case of using the CTS (CTS to itself), the communication device 21 configures the medium reservation range for the BLE communication (BLE medium reservation period t52). Note that, in the wireless LAN system according to the present embodiment, the frame including the system identification information field may be defined as a frame of the MAC frame type that is different from the data frame not including the system identification information field. In FIG. 15, although the identification system information is disposed in front of the service set identification information field, the invention according to the present embodiment is not limited thereto.

As described above, in the wireless LAN system in which the data frame including the service set identification information and the system identification information is transmitted, the communication device 21 equipped with the wireless LAN and the BLE can reduce the interference from the wireless LAN and prevent the response packet from disappearing in the period of the BLE communication with the communication device 31 regardless of the content of the service set identification information. Note that, the system identifier can also be made to be an identifier for each system. For example, the system identifiers #0, #1, and #2 are made to be an identifier indicating the presence of a system based on a first wireless LAN standard, an identifier indicating the presence of a system based on a second wireless LAN standard, and an identifier indicating the presence of a system based on the BLE, respectively.

Fourth Embodiment

In the present embodiment, the radio medium reservation for the BLE communication in a case that the RTS frame/the CTS frame of the wireless LAN includes the system identifier will be described. Note that, descriptions of the same portions as in the first embodiment to the third embodiment will be omitted.

Figure 16:
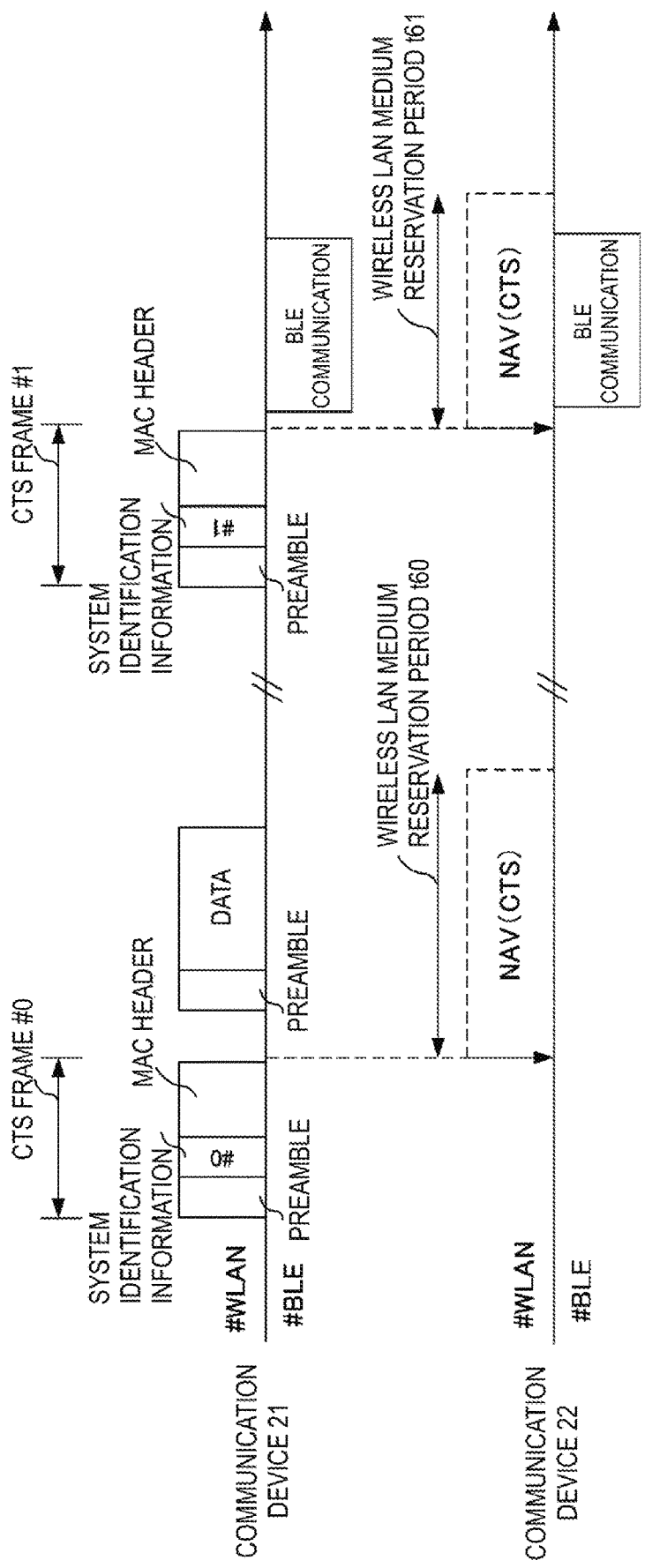
FIG. 16 is a diagram illustrating a configuration example of a medium reservation range of a communication device equipped with the wireless LAN and the BLE according to a fourth embodiment.

FIG. 16 is a diagram illustrating a configuration example of the medium reservation range of the communication device equipped with the wireless LAN and the BLE according to the present embodiment. FIG. 16 illustrates a case that the communication device 21 transmits the CTS frame (CTS to self) and configures the NAV (CTS) period. The CTS frame according to the present embodiment includes at least the system identification information field. The system identification information field can be included in a physical layer header. The system identifier can also be made to be an identifier for each system. In FIG. 16, a CTS frame #0 is constituted of the preamble, the system identification information field, and an MAC header. In the MAC header, the Duration field is included. In the system identification information field, a system identifier #0 is an identifier indicating that the NAV period is configured for the wireless LAN. A system identifier #1 is an identifier indicating that the NAV period is configured for communication other than the wireless LAN communication. Note that, in FIG. 16, although the system identification information is disposed in front of the MAC field, the invention according to the present embodiment is not limited thereto. For example, the system identification information may be disposed behind the MAC header.

The communication device 21 transmits the CTS frame #0 after prescribed back-off. The communication device 21 configures the system identifier #0 in the system identification information field of the CTS frame #0. The communication device 22 that has received the CTS frame #0 configures a medium reservation period t60 for the wireless LAN. The communication device 21 transmits the data frame of the wireless LAN in the period t60.

The communication device 21 transmits a CTS frame #1 after prescribed back-off. The communication device 21 configures the system identifier #1 in the system identification information field of the CTS frame #1. The communication device 22 that has received the CTS frame #1 configures a medium reservation period t61 for the wireless LAN. The communication device 21 performs the BLE communication in the period t61. Additionally, the communication device 22 may perform the BLE communication in the period t61.

The communication device 21 transmits the CTS frame #1 in the wireless LAN in synchronization with the effective connection interval of the BLE. After the period of the CTS frame #1, the communication device 21 starts the connection event of the BLE. The communication device 21 configures a Duration field value while taking the connection interval/the slave latency/the effective connection interval of the BLE communication into consideration in the Duration field of the CTS frame #1. For example, the communication device 21 configures the period in which the connection event including the polling packet including the read request is transmitted in the NAV period.

The communication device equipped with the wireless LAN and the BLE can notify the communication devices in the periphery of which one of the wireless LAN and the BLE is to be used, in order to transmit the CTS frame including the system identification information. With this configuration, the communication device that has transmitted the CTS and the communication devices that are present in the periphery thereof can reduce the interference from the wireless LAN and prevent the response packet from disappearing in the period of the BLE communication. Note that, although the present embodiment describes the case that the system identifier is included in the CTS frame, the system identifier can also be included in the RTS frame. In the wireless LAN system according to the present embodiment, the control frame including the system identification information field may be defined as a frame of the MAC frame type that is different from the control frame not including the system identification information field.

A program running on the communication device according to an aspect of the present invention is a program (a program for causing a computer to operate) that controls a CPU and the like in such a manner as to enable the functions of the above-described embodiments according to the present invention. The information handled by these devices is temporarily held in a RAM at the time of processing, and is then stored in various types of ROMs, HDDs, and the like, and read out by the CPU as necessary to be edited and written. Here, a semiconductor medium (a ROM, a non-volatile memory card, or the like, for example), an optical recording medium (DVD, MO, MD, CD, BD, or the like, for example), a magnetic recording medium (a magnetic tape, a flexible disk, or the like, for example), and the like can be given as examples of recording media for storing the programs. In addition to realizing the functions of the above-described embodiments by executing loaded programs, the functions of the present invention are realized by the programs running cooperatively with an operating system, other application programs, or the like in accordance with instructions included in those programs.

In a case that delivering these programs to market, the programs can be stored in a portable recording medium, or transferred to a server computer connected via a network such as the Internet. In this case, the storage device serving as the server computer is also included in the present invention. Furthermore, some or all portions of the communication device in the above-described embodiments may be achieved as LSI, which is a typical integrated circuit. The functional blocks of the communication device may be individually achieved as chips, or may be partially or completely integrated into a chip. In a case that the functional blocks are integrated into a chip, an integrated circuit control unit for controlling them is added.

The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, it is also possible to use an integrated circuit based on the technology.

Note that the invention of the present patent application is not limited to the above-described embodiments. The communication device according to the invention of the present patent application is not limited to the application in the mobile terminal, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention have been described in detail thus far with reference to the drawings, but the specific configuration is not limited to the embodiments. Other designs and the like that do not depart from the essential spirit of the invention also fall within the scope of the claims.

INDUSTRIAL APPLICABILITY

The present invention can be preferably used in a communication device and a communication method.

The present international application claims priority based on JP 2016-016882 filed on Feb. 1, 2016, and all the contents of JP 2016-016882 are incorporated in the present international application by reference.

REFERENCE SIGNS LIST

10, 11, 12 Access point
20-1, 20-2, 21, 22 Communication device equipped with wireless LAN and BLE
31-1, 31-2, 32, 33-1, 33-2, 34 Communication device equipped with BLE
10a, 11a, 12a Wireless LAN communication area
20-1a, 20-2a, 21a, 22a BLE communication area
100, 200-1, 200-2, 300 Antenna unit
101, 2011 First radio transmission and/or reception unit
102, 2012 First higher layer processing unit
201 First radio communication processing unit
202 Second radio communication processing unit
203 Radio channel management unit
301, 2021 Second radio transmission and/or reception unit
302, 2022 Second higher layer processing unit

The invention claimed is:

1. A communication device for transmitting and/or receiving a signal using a plurality of radio communication systems, the communication device comprising:
a non-transitory computer-readable medium that stores computer-executable instructions; and
a processor that executes the computer-executable instructions stored in the non-transitory computer-readable medium to perform at least functions of:
transmitting a signal configured to reserve a first frequency indicating that a radio wave of a prescribed frequency band is used using a first radio communication system among the plurality of radio communication systems;
transmitting, after transmitting the signal indicating that the radio wave is used, a signal configured to request transmission of data to another communication device using a second radio communication system that is different from the first radio communication system;
transmitting, after transmitting the signal configured to reserve the first frequency, a signal including service set identification information identifying a network of the first radio communication system; and
configuring, in a case of transmitting the signal configured to request the transmission of data to the other communication device using the second radio communication system, information indicating not to designate a specific network to the service set identification information.

2. A communication device for transmitting and/or receiving a signal using a plurality of radio communication systems, the communication device comprising:
- a non-transitory computer-readable medium that stores computer-executable instructions; and
- a processor that executes the computer-executable instructions stored in the non-transitory computer-readable medium to perform at least functions of:
  - transmitting a signal configured to reserve a first frequency indicating that a radio wave of a prescribed frequency band is used using a first radio communication system among the plurality of radio communication systems;
  - transmitting, after transmitting the signal indicating that the radio wave is used, a signal configured to request transmission of data to another communication device using a second radio communication system that is different from the first radio communication system;
  - transmitting, after transmitting the signal configured to reserve the first frequency, a signal including system identification information indicating whether or not to perform data transmission using the first radio communication system; and
  - transmitting, in a case that the system identification information stores an identifier indicating that data transmission is performed using a communication system other than a wireless LAN, a signal configured to request transmission of data to another communication device using the second radio communication system.

* * * * *